United States Patent
Kobe et al.

(10) Patent No.: US 6,904,615 B2
(45) Date of Patent: Jun. 14, 2005

(54) METHOD FOR DEFINING A FRICTIONAL INTERFACE

(75) Inventors: James J. Kobe, Newport, MN (US); Leon Levitt, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/436,416

(22) Filed: May 12, 2003

(65) Prior Publication Data

US 2003/0203155 A1 Oct. 30, 2003

Related U.S. Application Data

(60) Division of application No. 09/637,567, filed on Aug. 11, 2000, now Pat. No. 6,610,382, which is a continuation-in-part of application No. 09/166,837, filed on Oct. 5, 1998, now Pat. No. 6,372,323.

(51) Int. Cl.⁷ .......................... A41D 19/00; A41D 13/00
(52) U.S. Cl. .......................... 2/161.8; 2/161.1
(58) Field of Search .............................. 2/161.1, 161.8; 442/76, 101; 428/119, 100, 104, 120, 167, 172

(56) References Cited

U.S. PATENT DOCUMENTS

| | | |
|---|---|---|
| 3,266,113 A | 8/1966 | Flanagan, Jr. |
| 3,585,101 A | 6/1971 | Stratton et al. |
| 3,654,047 A | 4/1972 | Berkowitz |
| 4,290,174 A | 9/1981 | Kalleberg |
| 4,343,848 A | 8/1982 | Leonard, Jr. |
| 4,488,918 A | 12/1984 | Jofs |
| 4,756,786 A | 7/1988 | Malaney |
| 4,872,243 A | 10/1989 | Fischer |
| 4,959,265 A | 9/1990 | Wood et al. |
| 5,059,271 A | 10/1991 | Taub |
| 5,077,870 A | 1/1992 | Melbye et al. |
| 5,201,101 A | 4/1993 | Rouser et al. |
| 5,234,740 A | 8/1993 | Reeves et al. |
| 5,511,248 A | 4/1996 | Widdemer |
| 5,908,680 A | 6/1999 | Moren et al. |
| 6,106,922 A | 8/2000 | Cejka et al. |
| 6,121,143 A | 9/2000 | Messner et al. |
| 6,372,323 B1 | 4/2002 | Kobe et al. |
| 2002/0114920 A1 | 8/2002 | Scholz et al. |

FOREIGN PATENT DOCUMENTS

| | | |
|---|---|---|
| DE | 32 00 693 A1 | 7/1983 |
| GB | 2 037 536 A | 7/1980 |
| WO | WO 93/04858 | 3/1993 |
| WO | WO 94/01051 | 1/1994 |
| WO | WO 97/27775 * | 8/1997 |
| WO | WO 00/20210 | 4/2000 |

* cited by examiner

Primary Examiner—Harold Pyon
Assistant Examiner—Brian P. Egan

(57) ABSTRACT

A friction control article including a backing layer having a first surface with an array of at least 100 upstanding stems per square inch and a second surface. At least a portion of the upstanding stems is an elastomeric material and the stems have an aspect ratio of at least 1.25. The first surface has a static coefficient of friction when dry of at least 0.6 and a static coefficient of friction when wet within 20% of the static coefficient of friction when dry. The first surface has a peel strength and a tensile strength of substantially zero when engaged with another slip control article. The first surface has a relatively high shear strength when engaged with another slip control article. The high shear forces are due primarily to the frictional properties of the elastomeric materials, not a mechanical interlock of the stems, such as on a mechanical fastener.

47 Claims, 6 Drawing Sheets

METHOD FOR DEFINING A FRICTIONAL INTERFACE

CROSS-REFERENCE TO RELATED APPLICATION

The present application is a division of U.S. Ser. No. 09/637,567, filed Aug. 11, 2000, now U.S. Pat. No. 6,610,382, which is a continuation-in-part of U.S. Ser. No. 09/166,837, filed Oct. 5, 1998, U.S. Pat. No. 6,372,323.

FIELD OF THE INVENTION

The present invention is directed to a friction control article having a pleasant and soft feel, high friction properties, and good performance in wet and dry conditions.

BACKGROUND OF THE INVENTION

The development of enhanced grip and anti-slip surfaces typically centers around the materials and the surface topology of the article. Common materials include natural and synthetic rubbers, styrenic block co-polymers, latex, ethylene vinyl acetate, ethylene-propylene rubber, polyurethane, polyester co-polymers, polyimides, and the like. The surface topology can range from smooth to having exaggerated gripping structures.

U.S. Pat. No. 3,585,101 discloses a thin sheet of a soft, ductile, flexible material, such as aluminum, brass, plastic or the like, having a knurled pattern embossed to provide an improved gripping surface. The sheet can be applied to solid objects using an adhesive.

U.S. Pat. No. 4,488,918 discloses a plastic film having a non-slip surface comprising spaced, random patterns of rigid peaks and ridges formed of a second thermoplastic material co-extruded with and bonded to a plastic film. The surface has a pattern of relatively high, sharp, irregular plastic peaks and ridges, sufficiently sharp, hard and rough to effect a mechanical gripping with other surfaces.

U.S. Pat. No. 5,234,740 discloses a slip control surface with a structured surface. The structured surface includes an array of protrusions, typically triangular pyramids. The patent discloses that the sheeting may be applied to the handles of athletic equipment such as softball bats, golf clubs, tennis, racquetball, squash, badminton racquets, as well as the handles of tools.

BRIEF SUMMARY OF THE INVENTION

The present invention relates to an improved friction control or gripping surface that has a pleasant and soft feel, high frictional properties and good gripping performance in both wet and dry conditions. The gripping surface is a soft micro-structured surface having an array of flexible upstanding stems of a variety of shapes produced from a thermoplastic elastomer. The size, spatial distribution, flexibility of the stems, stem array pattern, and the properties of the elastomer material all contribute to the soft feel of the surface, vibration dampening, and the gripping performance under wet and dry conditions. The various embodiments of the present friction or slip control surface may include micro-channels, an absorbent layer and hydrophilic/hydrophobic regions all for directing fluids away from the upstanding stems, leaving them dry and providing high frictional performance even in wet conditions. The present slip control article may be formed in a sheet structure, such as a wrap that can be applied to another article. Alternatively, the slip control article may be incorporated into a variety of molded or manufactured articles, including sport grips for golf clubs, baseball bats, racquets, bicycle handles, exercise equipment, household articles, construction and surgical tools, non-slip walking surfaces for swimming pool decks, diving boards, bathtubs.

In one embodiment, the slip control article comprises a backing layer having a first surface with an array of at least 15.5 stems/centimeter$^2$ (100 stems per square inch), and more typically at least 54 stems/centimeter$^2$ (350 stems per square inch) and a second surface. At least a portion of an exterior surface of the upstanding stems is an elastomeric material. The stems have an aspect ratio (stem height: stem diameter) of at least 1.25, and preferably at least 1.5, and more preferably at least 2.0 and most preferably greater than 3.0. The first surface has a static coefficient of friction when dry of at least 0.6 and a static coefficient of friction when wet within 20% of the static coefficient of friction when dry. Therefore, frictional properties do not substantially degrade when water is present. The first surface has a peel strength and a tensile strength of substantially zero when engaged with another slip control surface.

In one embodiment, an array of upstanding stems comprising an elastomeric material is also formed on the second surface. The second surface has a static coefficient of friction when dry of at least 0.6 and a static coefficient of friction when wet within 20% of the static coefficient of friction when dry. The second surface has a peel strength and a tensile strength of substantially zero when engaged with another slip control surface.

In other embodiments, the static coefficient of friction when dry is at least 1.0 or at least 2.0. The first surface has a dynamic shear strength of at least 23,268 dynes/centimeter$^2$ (5.4 ounces/inch$^2$), and preferably more than 43,090 dynes/centimeter$^2$ (10 ounces/inch$^2$), and more preferably at least 77,562 dynes/centimeter$^2$ (18 ounces/inch$^2$) and most preferably at least 107,725 dynes/centimeter$^2$ (25 ounces/inch$^2$) when engaged with another slip control surface at a pressure of about 53 grams/6.45 centimeter$^2$. The high shear forces are due primarily to the frictional properties of the elastomeric materials, not a mechanical interlock of the stems, such as on a mechanical fastener.

The backing layer may be one or more layers, such as a reinforcing web, a foam layer, a substantially inelastic polymeric layer, or an adhesive or foamed adhesive layer, depending on the application of the slip control article. In one embodiment, the backing layer may be the elastomeric material integrally formed with the upstanding stems. The backing layer may be elastic or inelastic, thick or thin, porous or non-porous, with or without an adhesive layer, etc. In one embodiment, a non-elastomeric backing layer may form a portion of the upstanding stems. Since the backing layer may optionally be extremely thin, the present slip control article may be configured as a very thin wrap or gripping tape suitable for use as lightweight gripping applications. Alternatively, the backing layer may be a portion of a molded, extruded or manufactured article.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION OF THE INVENTION

Figure 1:
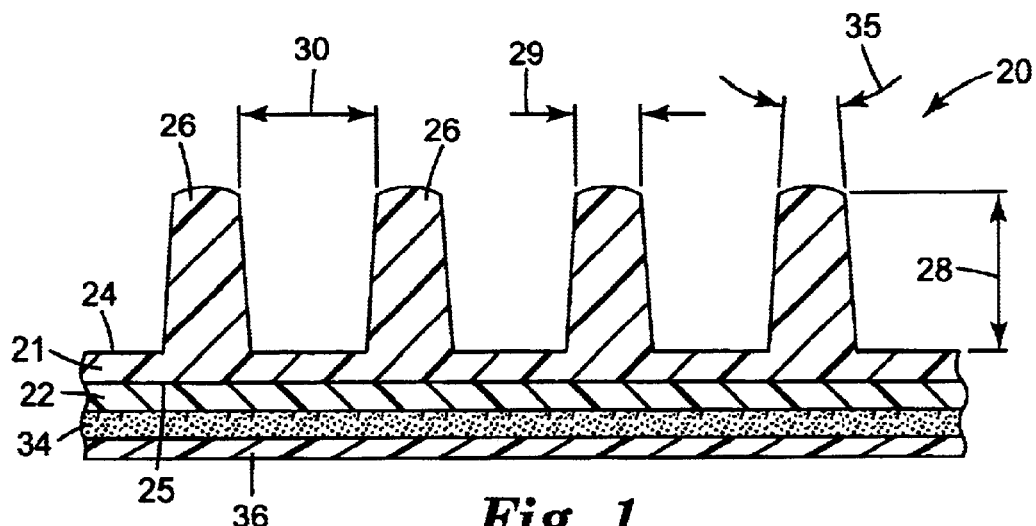
FIG. 1 is a side-sectional view of a friction or slip control article in accordance with the present invention.

FIG. 1 is a side-sectional view of a friction or slip control article 20 in accordance with the present invention. The article 20 includes a backing layer 21 having a first surface 24 with an array of upstanding stems 26. The stems may be arranged in a regular or an irregular array. Various patterns of stems may be used, such as hexagonal, diagonal, sinusoidal, etc. The upstanding stems 26 are constructed of an elastomeric material. The entire exterior surface of the upstanding stems 26 are an elastomeric material. In the embodiment of FIG. 1, the backing layer 21 is integrally formed with the upstanding stems 26 of an elastomeric material. The combination of the backing layer 21 and the upstanding stems 26 is sometimes referred to as a stem web. Although the illustrated embodiments show the stems 26 as being generally cylindrical, the sides of the stems 26 typically have a slight taper 35 to facilitate removal from the mold. A variety of non-cylindrical shapes can also be utilized, such as truncated cones or pyramids, rectangles, hemispheres, squares, hexagon, octagon, gum drops, and the like.

The present slip control article 20 requires primarily upstanding stems 26 constructed of an elastomeric material and a backing layer 21 to hold the structure together. The elastomeric properties of the backing layer 21, however, do not fulfill all requirements for some applications, such as when the slip control article 20 is used as a gripping wrap. Therefore, additional backing layers 22, 34, 36 are optionally applied to the second surface 25 to reinforce the backing layer 21. The additional backing layer 22 may serve to stabilize and reinforce the slip control article 20, to resist stretching and improving tear resistance, as well as a variety of other functions. Adhesive layer 34 and release liner 36 are optionally provided for attaching the present slip control article 20 to another surface. As used herein, backing layer refers to an assembly having one or more layers supporting the upstanding stems, although typically at most one of these layers is integrally formed with the upstanding stems.

The backing layer is typically about 0.05 millimeters to about 0.38 millimeters (0.002 inches to 0.015 inches) thick. In some instances, the backing layer is sufficiently thick to bond a reinforcing web during extrusion, such as a sheet of fabric, to impart increased tear resistance and tensile strength. The reinforcing web is particularly useful when the slip control article is attached to a flexible substrate via sewing. The backing layer may be a foamed or a solid polymeric material. In one embodiment, the backing layer may include a porous and/or absorbent layer, such as layers of fibrous material or fabric scrim which may be woven or nonwoven. A porous material is useful for absorbing moisture and/or directing moisture away from the upstanding stems. In one embodiment, the backing layer includes a substantially inelastic layer to prevent necking or stretching of the slip control article.

It is desirable for the backing layer to be sufficiently compatible with the elastomeric material to keep the slip control article together. Suitable backing layer materials include thermoplastic polyurethanes, polyvinyl chlorides, polyamides, polyimides, polyolefins (e.g., polyethylene and polypropylene), polyesters (e.g., polyethylene terephthalate), polystyrenes, nylons, acetals, block polymers (e.g., polystyrene materials with elastomeric segments, available from Shell Chemical Company of Houston, Tex., under the designation KRATON™, polycarbonates, thermoplastic elastomers (e.g. polyolefin, polyester or nylon types) and copolymers and blends thereof. The thermoplastic material may also contain additives, including but not limited to fillers, fibers, antistatic agents, lubricants, wetting agents, foaming agents, surfactants, pigments, dyes, coupling agents, plasticizers, suspending agents, hydrophilic/hydrophobic additives, and the like.

The optional adhesive layer typically comprises an adhesive selected to provide a bond to a substrate article to which the slip control surface is to be applied, such as pressure sensitive adhesives, thermosetting or thermoplastic adhesives, radiation cured adhesives, adhesives activated by solvents, and blends thereof. The adhesive may include filaments. The backing layer can optionally be laminated or impregnated with the adhesive. One adhesive useful in the present invention is Adhesive Transfer Tape 950 available from Minnesota Mining and Manufacturing Company. Many suitable epoxy, urethane, synthetic or natural based rubber and acrylic adhesives are commercially available for this purpose as well. Depending upon the application, the adhesive may releasably bond or permanently bond the slip control article to a surface.

Figure 1A:
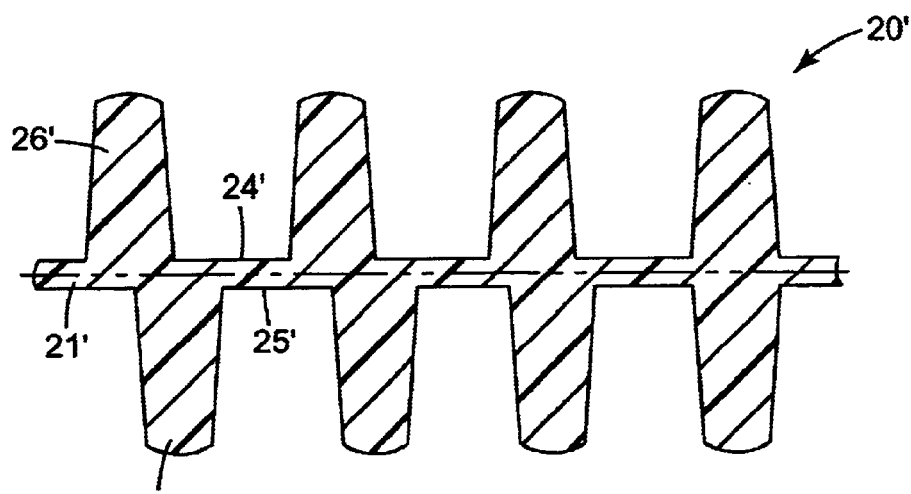
FIG. 1A is a side-sectional view of a two-sided slip control article in accordance with the present invention.

FIG. 1A is a sectional view of a two-sided slip control article 20' as generally illustrated in FIG. 1, without the additional backing layers 22, 34, 36. The article 20' includes a backing layer 21' with an array of upstanding stems 26' on both the first and second surfaces 24', 25'. The upstanding stems 26' are constructed of a single elastomeric material. In the embodiment of FIG. 1A, the backing layer 21' is integrally formed with the upstanding stems 26' of an elastomeric material. In another embodiment, the upper and lower portions maybe co-extruded from two different elastomeric materials. A two-side slip control article in accordance with the present invention may be formed from the various disclosed embodiments.

Figure 2:
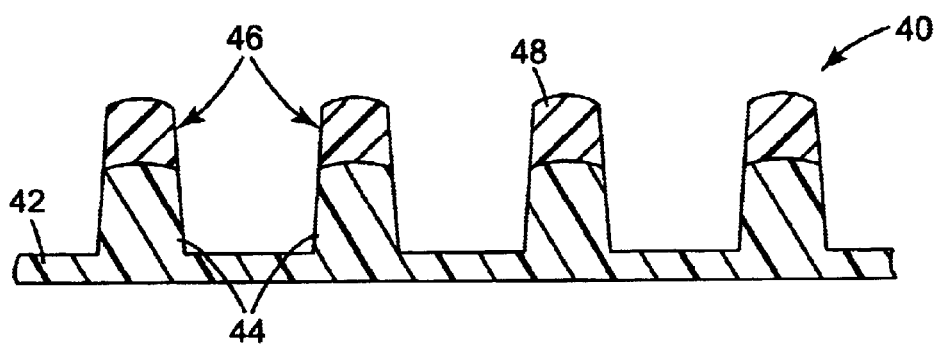
FIG. 2 is a side-sectional view of an alternate slip control article in accordance with the present invention.

FIG. 2 is a side-sectional view of an alternate slip control article 40 in accordance with the present invention. Backing layer 42 defines lower portions 44 of the stems 46. The upper portions 48 of the stems 46 are constructed of the elastomeric material. The backing layer 42 and lower portions of the stems 44 may be constructed of a variety of materials, elastomeric or non-elastomeric, depending upon the application for the slip control article 40. At a minimum, the exterior surface of the upper portions 48 are an elastomeric material. In one embodiment, the upper portions 48 of the stems 44 have hydrophobic properties. Hydrophobic properties may be obtained by constructing the upper portions 48 from a hydrophobic material or treating the upper portions 48 to achieve hydrophobic properties. For applications involving contact with non-polar liquids, the upper portions 48 of the stems 46 may be treated to achieve hydrophilic properties (e.g., corona treatment).

Figure 3:
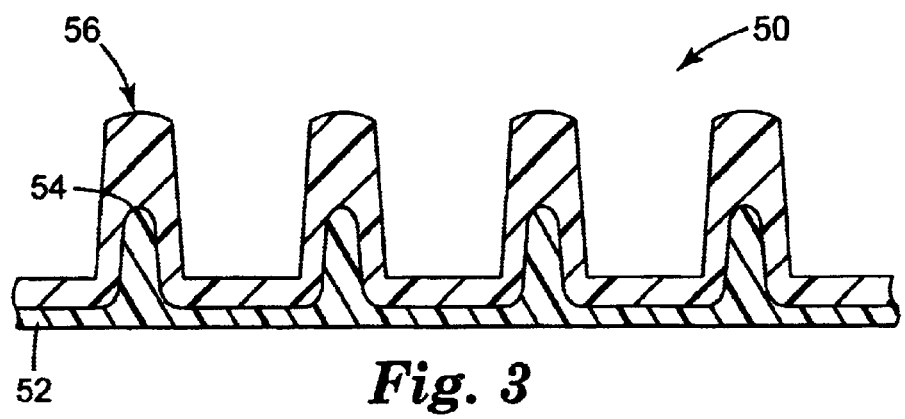
FIG. 3 is a side-sectional view of co-extruded slip control article in accordance with the present invention.

FIG. 3 is a side-sectional view of another alternate slip control article 50 formed by co-extrusion in accordance with the present invention. The backing layer 52 protrudes into a center regions 54 to add structural integrity to the elastomeric stems 56. The backing layer 52 is typically a stiffer polymeric material.

Figure 3A:
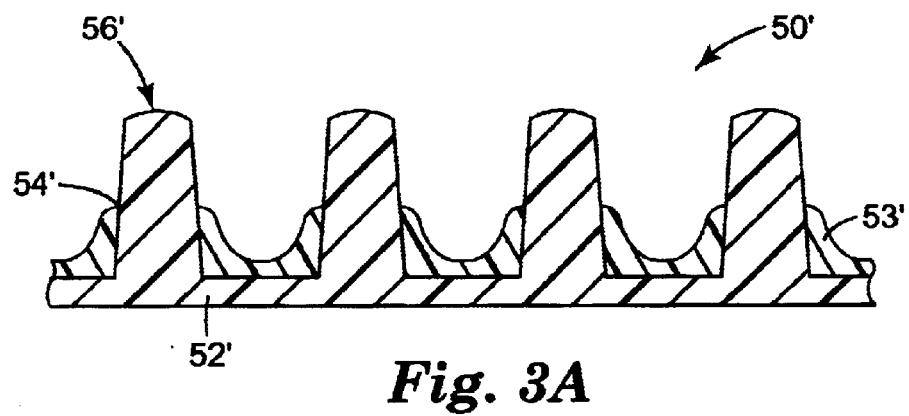
FIG. 3A is a side-sectional view of an alternate co-extruded slip control article in accordance with the present invention.

FIG. 3A is an alternate slip control article 50' formed by co-extrusion in accordance with the present invention. The stems 56' and backing layer 52' are constructed of an elastomeric material. The stems 56' protrude through a center region 54' of an additional backing layer 53'. The additional backing layer 53' may provide structural stability, hydrophobic/hydrophilic properties or a variety of other functions. In one embodiment, the additional backing layer 53' maybe an elastomeric material with properties different from those used to construct the stems 56'.

Figure 4:
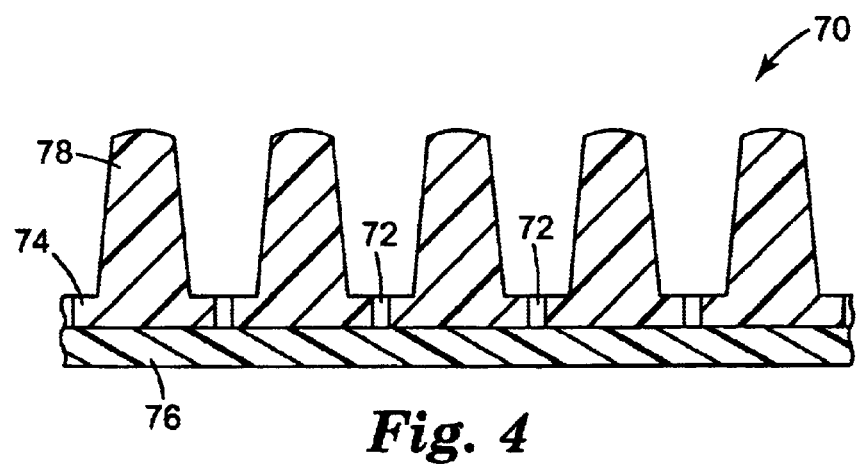
FIG. 4 is a side-sectional view of a slip control article with an absorbent layer on the second surface in accordance with the present invention.

FIG. 4 is a side-sectional view of an slip control article 70 incorporating a plurality of holes 72 through the backing layer 74 in fluid communication with an absorbent layer 76. The absorbent layer 76 draws moisture away from the elastomeric stems 78 to maintain good frictional properties in wet conditions.

Figure 5A:
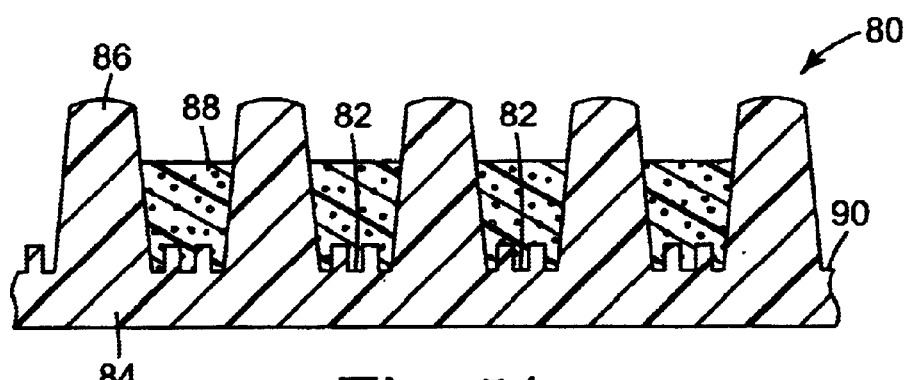
FIG. 5A is a side-sectional view of a slip control article including micro-channels and an absorbent material in accordance with the present invention.
Figure 5B:
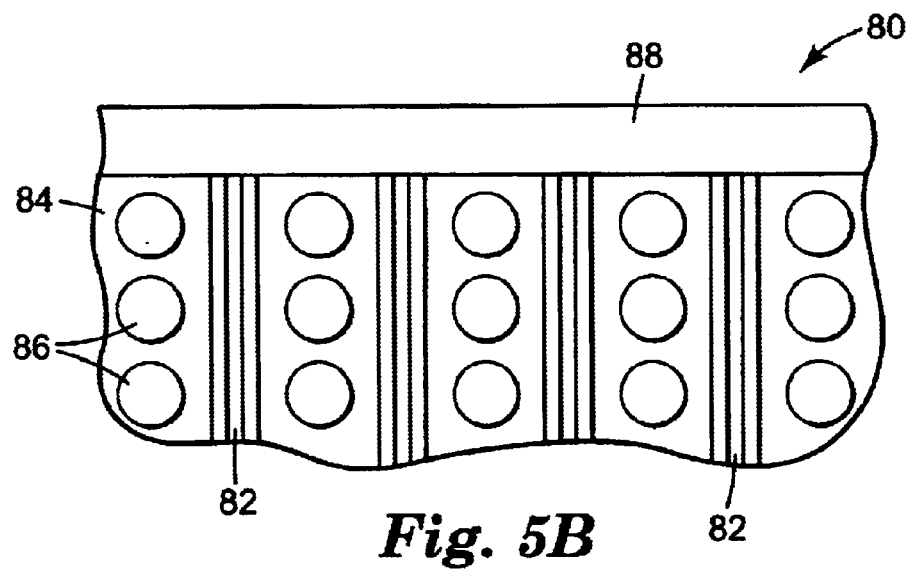
FIG. 5B is a top view of the slip control article of FIG. 5A.

FIGS. 5A and 5B illustrate a slip control article 80 incorporating micro-channels 82 on the backing layer 84 between the upstanding elastomeric stems 86. The micro-channels 82 utilize capillary forces to cause the rapid transport of a fluid in a direction of a driving force. Absorbent layer 88 is located along the first surface 89 of the backing 84 to provide the driving force. Alternatively, the driving force may be gravity and/or hydrophilic areas on the stems 86.

Figure 6:
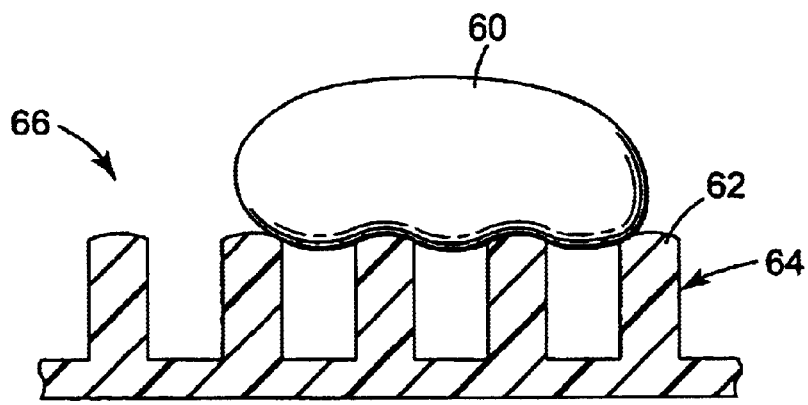
FIG. 6 is a schematic illustration of a water droplet interacting with a slip control article in accordance with the present invention.

A number of mechanisms combine to give the present slip control article exceptional frictional properties in both wet and dry conditions. FIG. 6 is a schematic illustration of an individual water drop 60 residing on hydrophobic tips 62 of the stems 64. The drop 60 is easily removed from the stem 64 by shaking or gripping of the slip control article 66. The redistribution of water is also impacted by stem density.

Figure 7:
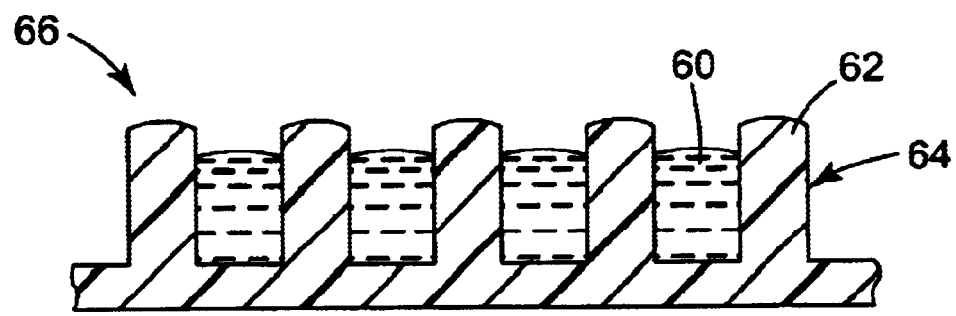
FIG. 7 is a schematic illustration of water being channeled away from the upstanding stems on a slip control article in accordance with the present invention.

Deposition of large amounts of water 60 results in distribution of the liquid at the base of the stems 64 while the tips 62 remain dry, as illustrated in FIG. 7. When water or any other polar liquid is deposited on the surface of the slip control article 66, the tips 62 of the stems 64 remain exposed due to the hydrophobic nature of the thermoplastic elastomer polymer. Constructing the backing layer from a hydrophilic material assists in directing the water 60 away from the tips 62.

The upstanding stems 64 grip with other surfaces primarily due to the frictional properties of the elastomeric material of the stems. Frictional performance does not require the stems 64 to protrude into the other surface (i.e., interlocking mechanical engagement is not required like on a two-part mechanical fastener). Therefore, frictional contact can be made with both soft and rigid materials.

The invention relates to a stem web construction with high friction characteristics and soft feel to the touch. The inventive structure comprises a multiplicity of stems arranged in a square, universally spaced or randomly spaced array. Preferably, the density of stems ranges from 900 to 3,000 stems per square inch, the diameter of the stems is generally 8 to 11 mils., and the aspect ratio of the stems is about 2. When water (or another polar fluid) is applied to the stem web surface of the inventive friction control article, the fluid distributes uniformly on the stemmed surface, between the stems. If the stems have a hydrophobic outer surface, the outermost tips of the stem remain dry due to the hydrophobicity of the material they are made of. Tapered walls (optional) on the stems create additional capillary force that drives fluid from the outermost tips down towards the backing upon which the stems are mounted and project therefrom. This unique interaction with water (or other polar fluids) makes the inventive structure useful for griping applications.

The soft feel of the inventive friction control article is created by a combination of a soft material, stem geometry and stem spacing. Thus, the positioning of the stems closer to each other than tactile points in human fingers makes it difficult to distinguish individual stems by feel. The stems bend under an applied grip pressure, which lends additional softness to the structure. It is also an important feature that the stems be made of a soft, low durometer (e.g., less than 50 Shore D) material which has a high coefficient of friction (e.g., higher than 0.8). The majority "softness" component of the construction originates from stem bending, rather than from material compression. The stems preferably are formed from a highly resilient elastomeric polymer which has very low values of tension and compression set. As a result, the inventive stem web construction retains its soft tactile feel after multiple uses. Bent stems expose additional surface area available for friction, thus enhancing griping performance. As the griping load is released, the stems return to their original upwardly projecting positions.

The present friction or slip control article provides high shear forces when engaged with another friction or slip control article, at minimal pressure. Since the upstanding stems are constructed substantially from a highly flexible elastomeric material, high shear forces are not derived from a mechanical interlock of the stems (such as on a mechanical fastener) or from a mere mechanical blocking from opposed rigid stems. Rather, the frictional properties of the upstanding stems are enhanced by the stem size, stem density, and stem pattern when two slip control articles are engaged with each other. The soft, high friction stems of the inventive slip control article are bendable to achieve the desireable characteristics. Possible applications include gloves having the present slip control article located for gripping a surface also including the slip control article.

Since the upstanding stems do not interlock, the present slip control article has substantially zero peel and tensile force when engaged with the same or a similar stem web structure. This feature is important to safe use of the present slip control article for gripping purposes, since the user must typically be free to quickly release the gripped item, without having to overcome any peel or tensile forces generated by the slip control articles. For example, the present slip control article can be wrapped around the handle bars of a bicycle and applied to bicycling gloves. When the user grips the handle bars of the bicycle, the two slip control articles engage to provide excellent slip control properties in shear with minimal pressure. However, the substantially zero value of peel and tensile forces allow the user to release the handle bars with substantially zero resistance from the two slip control articles.

When the stem web surfaces of two inventive friction control articles are combined face-to-face, a predetermined blend of mechanical interference and stem to stem friction between the opposed stems create a predictable and reliable friction control interface. While such opposed stem webs may be identical, the stem web surfaces do not have to be identical in nature, material or stem spacing for this to occur. Thus a 3,000 stem/inch$^2$ pattern on one surface would achieve an effective mechanical interference with a 1,000, 2,000, 3,000, etc., stem/inch$^2$ pattern on an opposed surface. The shear performance is dependent upon the stem density and is predictable. As a lateral displacement force is applied between the two opposed stem web surfaces, the stems of each surface slip along the sides of the stems of the other surface and bend. This type of interaction creates a controlled friction force that results from stem engagement which is not at all the same as the interlocking of opposed stems like on a mechanical two-part fastener. The effective coefficient of friction between the two friction control articles depends upon the relative materials used, stem geometries, stem spacings and the magnitude of applied force normal to the friction surface.

Figure 10:
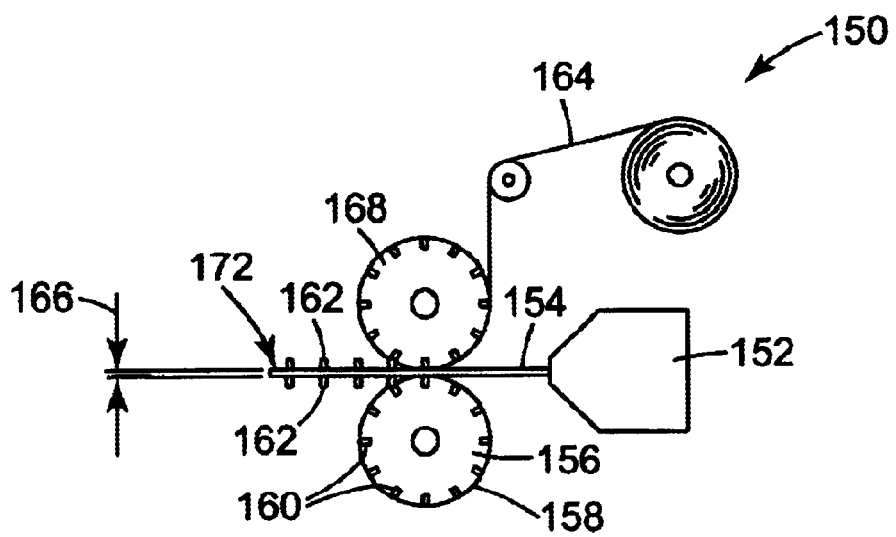
FIG. 10 is a side sectional view of two of the inventive friction control articles in mated contact, such as between a glove and handle where each has the inventive article affixed thereon.
Figure 11:
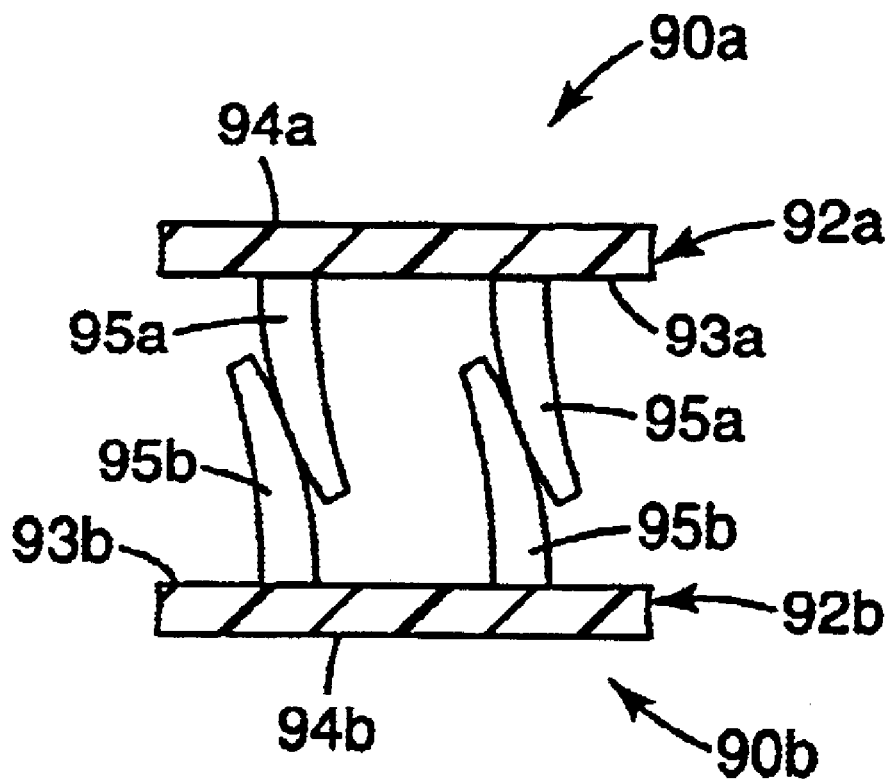
FIG. 11 is an enlarged view of a portion of area A in FIG. 10 as the opposed surfaces move past each other, overcoming stem interference.

FIGS. 10 and 11 illustrate in general terms the relationship between opposed mated stem webs of two friction control articles which are aligned in a face to face interference relation. FIG. 10 illustrates opposed slip control articles 90$a$ and 90$b$. Slip control article 90$a$ has a backing layer 92$a$ with a first surface 93$a$ and a second surface 94$a$. Upstanding stems 95$a$ project from the first surface 93$a$ of the backing layer 92$a$. Another backing layer or other support body structure 96$a$ is affixed to the second surface 94$a$ of the backing layer 92$a$. Likewise, the slip control article 90$b$ has a backing layer 92$b$ with a first surface 93$b$ and a second surface 94$b$. An array of upstanding stems 95$b$ projects from the first surface 93$b$ of the backing layer 92$b$. Another backing layer or other support body structure 96$b$ is affixed to the second surface 94$b$ of the backing layer 92$b$. When the slip control articles 90$a$ and 90$b$ are aligned in stem web facing alignment (as in FIG. 10) and urged together by a force normal to the stem web arrays thereon, the stems mechanically interfere as shown.

FIG. 11 illustrates in greater detail the contact engagement of opposed stems 95$a$ and 95$b$ when a lateral displacement force is applied between the two opposed slip control articles 90$a$ and 90$b$. The engaged stems bend yet resist relative lateral movement of the opposed slip control articles 90$a$ and 90$b$, thus achieving a high shear force resistance, while still providing little or no peel force resistance for separating the opposed slip control articles 90$a$ and 90$b$. The degree of stem bending depends on material properties and applied forces.

In optimizing the frictional interface of two opposed inventive friction control articles, it is preferred that the total stem area of each friction control article (the area of the stems relative to the total area of the article, as considered in the orientation of FIG. 5B) be less than about 45% to allow for the stems of the two opposed friction control article surfaces to easily fit together. While a less than about 45% total stem area is preferable, a more preferable total stem area is less than about 40%, and an even more preferable total stem area is less than about 35%. In one preferred embodiment, the total stem area is about 30%. There is thus significant void area between the stems in relation to the total stem area. When two of the inventive friction control stemmed surfaces are brought in contact with each other (e.g., FIG. 10), the spacial interference of the stems resists relative lateral movement. Further lateral movement force against one or both of the friction control articles causes the stems to bend and slide against each other (see, e.g., FIG. 11). Resistance to sliding of one friction control griping surface against the other originates from two factors: (1) the force required to bend the stems to clear the passage, and (2) friction between the walls of the opposed stems. Each factor can be adjusted to address a specific friction control application and achieve desired frictional characteristics. Thus, changing the coefficient of friction of the material forming the stems increases the friction factor. Changing the shapes of the stems, for example making them square in cross section, increases overlap between the stems and will result in higher forces required to bend the stems. A higher flex modulus of the material will bring a similar result, which is a larger magnitude of forces required to slide the opposed surfaces.

In some embodiments, the opposed mating surfaces of the friction control materials may be formed from the same material, with both stems bending in a like manner, or one of the friction control articles may be formed from a material which is stiffer and less flexible than the other (or even rigid). As mentioned above, these factors may be varied to control the desired frictional characteristics of mated friction control articles, so long as one of the arrays of stems is sufficiently flexible to bend to some degree. Generally, the coefficient of friction is a property of the surface and is force independent. In our invention, however, stems deform under the applied vertical load, which alters the effective (measured) coefficient of friction. This later fact makes friction load dependent. Therefore, we introduce the term pseudo-coefficient of friction, which stands for measured coefficient. This later value can be expressed as a ratio of lateral force to the normal force exerted on the article.

The frictional interface between the facing contact surfaces of opposed friction control articles can be predetermined by design, dependent upon the relative materials used, stem geometries, stem spacings and the magnitude of applied force normal to the friction surface. The stems of the opposed stem arrays are aligned in a opposed, contacting and interfitting relation (such as seen in FIG. 10) when a normal force is applied, and the application of a relative lateral displacement force between the stem arrays causes the stems of at least one of the arrays to bend. Relative lateral movement of the two opposed friction control articles is resisted by a predictable force required to bend those stems and the frictional interference between opposed contacting stems.

The soft feel of the present slip control article is due primarily to the nature of the elastomeric material and to stem geometry. The elastomeric material preferably has a Shore hardness of less than about 70D (Estane™ 58091); more preferably less than about 90A, and most preferably less than about 60A. The tensile modulus is preferably less than about 12 MPa, more preferably less than about 6 MPa, and most preferably less than about 4 MPa. Stem height, stem diameter, and spacing between the stems (referred to as stem geometry) are significant factors in establishing a soft feel on the surface. Generally, longer stems result in a softer feel due to their flexibility. As for stem spacing, the average distance between the tactile points in fingertips is approximately 1.27 millimeters (0.050 inches). When the spacing between the objects is less than half the tactile distance, it becomes difficult to distinguish between the protrusions on the surface. Therefore, the best feel is typically obtained for a stem web with the highest available density of stem. A stem density in excess of 310 stems/centimeter$^2$ (2,000 stems per square inch) creates a unique soft and pleasant feel for skin contact.

Referring again to FIG. 1, the stems need to be substantially upstanding to optimize the performance of the slip control article. The stems are kept upstanding by the stem diameter and the nature of the elastomeric material. The upstanding stems typically have a height 28 in the range of about 0.254 millimeters to about 1.27 millimeters (0.010 inches to about 0.050 inches), and more typically in the range of about 0.51 millimeters to about 1.02 millimeters (0.020 inches to 0.040 inches). The separation or gap 30 between adjacent stems 26 is generally in the range of about 0.254 millimeters and about 2.54 millimeters (0.01 inches to about 0.1 inches) and more typically in the range of about 0.46 millimeters to about 0.84 millimeters (0.018 inches to 0.033 inches). The stems 26 have a maximum cross sectional dimension 29 of about 0.076 millimeters to about 0.76 millimeters (0.003 inches to about 0.030 inches). The stems 26 are arranged on the backing in a density of at least 15.5 per centimeter squared (100 per square inch), and more typically about 54 per centimeter squared to about 1550 per centimeter squared (350 per square inch to about 10,000 per square inch).

The stems have an aspect ratio of at least 1.25, and preferably at least 1.5, and more preferably at least 2.0 and most preferably greater than 3.0., although aspect ratios in excess of 3.0 are possible for some applications. Aspect ratio refers to the ratio of pin height to the maximum cross sectional dimension. For pins with a circular cross section, the maximum cross sectional dimension is the pin diameter. When the stems or pins are formed from an elastomeric material, the relatively small stem diameter enhances the soft nature of the stem web surface to the touch.

Figure 8:
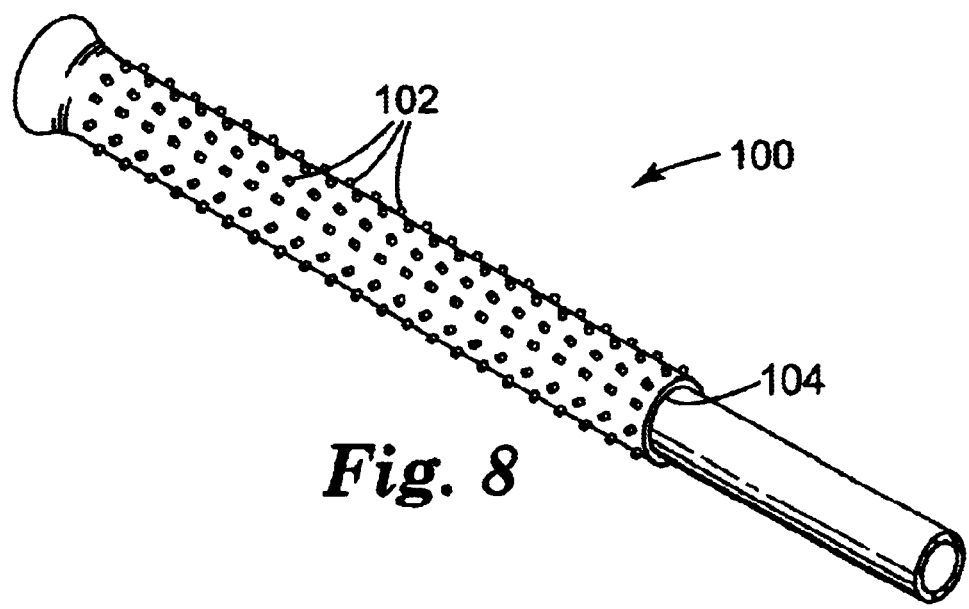
FIG. 8 is a perspective view of an exemplary article incorporating the slip control article of the present invention.

FIG. 8 is a perspective view of an exemplary article 100 incorporating the slip control surface 102 in accordance with the present invention. The article 100 is a molded grip having an opening 104 at one end, suitable for attachment to a variety of structures such as golf club, baseball bats, handles, and the like. The article 100 may be made using a variety of processes, such as injection molding, profile extrusion, roll extrusion forming, etc.

In some embodiments, providing optical effects on the friction control article may be desired. This may be achieved through additional microreplication techniques on one or both sides of the backing layer and/or by forming the backing layer from a material which is transparent, translucent, polarizing, etc. For example, in reference to the slip control article 20 of FIG. 1, a transparent backing layer 21 would allow printing on the second surface 25 of the backing layer 21 to be visible from the stem web side of the slip control article 20. The stems 26 may also be transparent, or formed from an alternative opaque material or coated with an opaque coating to achieve a variety of desired optical effects. Alternatively, the printing may be applied on the first surface 24 of the slip control article 20 (on the lands between stems 26) for any desired informative, decorative or advertising purpose. A particular slip control article may be fully transparent, or only transparent in part or parts, as desired.

Numerous additional applications for the inventive friction or slip control article are contemplated. These would include use of the friction control article alone (on one surface), or in combination with an opposed friction control article (such as providing the friction control article on the palm of a glove and on the opposed handle of a tool for mating engagement as the tool is handled). The inventive friction control article has further utility in a number of applications in various fields, such as sports, medical, home, transportation, military and industrial applications. In many such uses, the inventive friction control article may include one or more of the other features disclosed herein (such as micro-channels, porous backing layers (e.g., adhesives), absorbent layers, alternate extrusion and formation techniques and structures (e.g., as an adhesive wrap), and varying the hydrophobic or hydrophilic properties of the friction control article (and specifically, the hydrophobic or hydrophilic properties of the stems thereon)), etc.

Additional contemplated sports applications for the friction control article of the present invention include:

- on the handles of paddles used in boating, such as canoe or kayak paddles
- on surfaces of boats and personal watercrafts to reduce slippage (on any surface engaged by a rider, such as the seat, handlebars, grips, footpads, deck surfaces, etc.)
- on those portions of skis (water or snow) engaged by the user's foot or boot
- on those parts of snowmobiles which are engaged by users to prevent slipping (such as the snowmobile seat, handles, grips, foottreads, etc.)
- on windsurfing boards and handles, and user engaged surfaces of sailboats and sailing equipment
- on equestrian equipment, such as reins, saddles, ridding breeches (e.g., thigh patches), jockey whips, brushes, etc.
- on gymnastics equipment (such as pommel horse, vault, floor exercise, rings and handles engaged or contacted by a gymnast)
- on the surfaces of balls to enhance the gripability, throwability, catchability, etc. of the ball
- on the handle or puck handling surface of a hockey stick (applied in sheet form, or wrapped about the stick in tape form)
- on the user contacted surfaces of skateboards
- on the user engaged surfaces of pedals, such as bike pedals, motorcycle pedals, automobile pedals, etc.
- on the user contacted surfaces of waterpark inner tubes, other water toys, rafts, floatation articles, etc.
- on the outer and/or inner surfaces of aqua socks for use in scuba diving and snorkeling applications, and/or on the inner surface of swim fins for use in scuba diving or snorkeling
- on the inner and/or outer surface of socks and/or the inner surface of boots or footwear to minimize slippage of a user's foot relative to such footwear
- on the outer surfaces of ball engaging footwear such as soccer shoes for increased fictional control and manipulation of a ball by a user
- on the exposed surfaces of uniform pad assemblies (such as football, hockey or lacrosse pads) and on inside mating portions of jerseys, pants, breezers or socks overlying such pads on speciality footwear for such sports as wrestling and gymnastics on sports training equipment, such as a golf training mat and shoes, where opposed friction control articles on the mat and shoes aid in teaching a user not to twist the feet when swinging a golf club on patches for straps such as backpack straps and camera straps to minimize slipping of the straps relative to a user (and also on opposed patches on the user's clothing which can mate with the patches on the straps)

on the foot side and/or floor side of sandals or other footwear on exercise equipment grips or handles, or other sports stick handles or grips or handlebars (such as, for example, field hockey sticks, BMX bike handlebars, racing vehicle steering wheels, rowing grips, water ski handles, pool ladder or stair handles, etc.)

on user engaged surfaces of kayaks, including the spray skirt and grippers on fire arm grips and handles, such as pistol grips, riffle butts, and opposed user worn surfaces such as gloves and shoulder pads on seat cushion surfaces (on the user contact and/or support contact sides thereof)

on archery equipment, such as on a riser grip and/or the string and nock area on all manner of gloves used in sporting applications, such as sailing, skiing, hunting, mountaineering, wheelchair racing, golf, racket sports, stick handling sports, ball handling sports, gymnastics, rafting, sailing, snowmobiling, archery, soccer goalie gloves, etc.

In many of these applications, a single friction control article may be sufficient to provide the desired frictional and/or gripping characteristics. In any application where a glove is worn by a user for engaging a sports article (whether that article be a ball, handle of a sports stick, or equipment fixture) the glove and the ball, handle or fixture as well can be provided with the inventive friction control article to provide a high shear strength between the opposed mated friction control articles but allow quick peel (i.e., release) therebetween, and to thereby improve the user's grip. In addition, the friction control article can be applied to the such sporting items by either molding it in a particular shape, applying patches thereof using adhesive or other affixing means, or by wrapping the items (such as a sports stick) with a tape of the friction control article.

Home use applications for the inventive friction control article are also numerous and include:

on patches on comforters or blankets to keep them in place on user engaged surfaces of toys and board games, including on handles for squirt guns, water pumps and paint ball equipment, or on floor engaged surfaces of play mats on user engaged surfaces of chairs, seats and kitchen utensils, and specifically for such items in connection with baby seats, baby chairs and utensils and eating items used for feeding children, and on high chair surfaces and diaper changing tables to prevent slipping of babies thereon on patches applied to air mattresses and/or sleeping bags to prevent relative slippage therebetween on garden tools and hoses on place mats (top and/or bottom surfaces thereof)

on the handles of kitchen utensils, equipment and appliances on user engaged surfaces of musical instruments, such as violin chin pads on one or more opposed surfaces for retaining a hair piece and/or hat in place on a wearer's head as a drawer liner or tool box liner as a non-slip layer on wooden or vinyl or other smooth floors for placement under throw rugs to prevent sliding thereof as a bath tub lining mat or non-slip surface in a bath, wash, kitchen or laundry rooms as covering material for hot pads as a slip resistance surface on eyeglass nose pads on pads or surfaces for article placement to prevent slippage thereof, such as pads for AV remote control maintenance on furniture surfaces (for contacting support surfaces, other associated furniture pieces, throws or a user)

as patches on wearing apparel for improving gripability, breathability and flexibility on pet equipment, such as cat climbing poles, pet booties (both inside and outside) and for litter box anti-slip pads, pet bowl anti-slip pads and/or anti-slip surfaces on the litter boxes or bowls themselves In many of these home use applications, a single friction control article may be sufficient to provide the desired frictional and gripping characteristics. In other applications, two opposed friction control articles may be cooperatively used to provide high shear strength between the opposed mated friction control articles but allow quick peel (i.e., release) therebetween (such as, for example, on opposed patches of friction control articles on an air mattress and sleeping bag). In addition the friction control article can be applied to such home use items by either molding it in particular shape, applying patches thereof using adhesive or other affixing means, or by wrapping the items (such as kitchen utensil handles) with a tape of the friction control article.

In the medical area, numerous uses are also available for the inventive friction control article, used either in a single application or in a mated application. These include:

on a drape mat to keep tools from sliding during medical procedures on seating or reclining areas, such as on dental chairs, examination table surfaces, steps, chiropractic table covers, etc.

on wheelchair seat, cushion and traction surfaces on user and/or floor engaging surfaces of crutches and walkers as surfaces for dental tool handles, and on dental tool trays and mats on the handles of orthopedic and other surgical tools, and/or on operator or surgeon gloves for use thereof on condoms or condom catheters (on inner and/or on outer surfaces thereof)

as a frictional surface to hold wraps of other materials in place as a material to facilitate the opening of medical containers, including easy open prescription bottles on surfaces within an ambulance or other medical emergency vehicle (e.g., medivac helicopter) to prevent slipping therein, and for enhancing gripability of users and/or non-slip surfaces for articles transported thereby as floor mats in medical facilities on surgical gloves (inner and/or outer surfaces thereof) for improving the frictional characteristics and/or enhancing user tactile sensation on medical booties (inner and/or outer surfaces thereof)

on disposable hospital room or shower mats or pads as pads or patches for nursing home beds to improve air circulation and reduce wounds due to constant frictional movement as disposable frictional mats for use in high fluids surgeries (e.g., arthroscopy, urology, etc.)

In many of these medical applications, a single friction control article may be sufficient to provide the desired frictional and/or gripping characteristics. Like the other field of use applications mentioned above, high shear strength between opposed mated friction control articles may be achieved by using two friction control articles on opposed surfaces (such as between tool handles and gloves, or between tool handles and holding trays). In addition, the friction control article can be applied to such medical items by either molding it in a particular shape, applying patches thereof using adhesive or other affixing means, or by wrapping the items (such as surgical tools handles) with a tape of the friction control article.

Numerous uses of the inventive friction control article in transportation-related applications are also contemplated. In addition to those mentioned above, the inventive friction control article may be used in a number of additional ways, including:

on tire surfaces on steering wheels, steering wheel covers, operator knobs, handles, and levers, etc., and/or on driving gloves, mechanic work gloves, etc.

on operator or passenger seats or on seatcovers in any vehicle (e.g., auto, truck, bus, plane, boat, train, motorcycle, go-cart, etc.)

on container storage surfaces to prevent parcels or equipment from sliding (e.g., as an auto trunk pad)

as a fender or body drape during vehicle maintenance to prevent tools from sliding on the vehicle surface and/or scratching the vehicle's surface as a floor mat for a vehicle (such as an auto floor mats)

on ski rack surfaces to engage skis for transportation thereof, or on vehicle engaging surfaces of removable roof racks, ski racks or cargo carriers as liners for drawers, cupboards and other storage containers in vehicles such as recreational vehicles, boats, planes, etc.

In many of these transportation applications, a single friction control article may be sufficient to provide the desired frictional and/or gripping characteristics. However, in some applications, two opposed frictional control articles may be utilized to provide high shear strength between the opposed mated friction control articles but allow quick peel (i.e. release) therebetween (such as, for example, on a steering wheel cover and driving glove). In addition the friction control article can be applied to such transportation items by either molding it in a particular shape, applying patches thereof using adhesive or other affixing means, or by wrapping the items (such as a steering wheel) with a tape of the friction control article.

The inventive friction control article also has applications in the military arena, in addition to those otherwise mentioned military-applicable uses previously cited. Additional military applications include:

on vehicle seat cushions, backpacks and apparel patches, etc.

on user engaged weapon surfaces such as rifle butts, pistol grips, triggers, etc.

for artillery shell loading applications, where the operator wears gloves bearing the friction control article and portions of the shell or a shell liner bear the inventive friction control article for mating with the operator's gloves In many of these military specific applications, a single friction control article may be sufficient to provide the desired frictional and/or gripping characteristics. In some applications, however, two opposed friction control articles are provided to provide high shear strength between the opposed mating friction control articles but allow quick peel (i.e., release) therebetween (such as between a shell loading operator glove and a shell liner). In addition, the friction control article can be applied to such miliary items by either molding it in a articular shape, applying patches thereof using adhesive or other affixing means, or by wrapping the items (such as a pistol grip) with a tape of the friction control article.

Other applications for use of the inventive friction control article include industrial or commercial applications, such as:

on ladder steps and/or shoe surfaces for use in facilitating hazardous materials handling (friction control surfaces on material containers, gloves for use in handling such containers, etc.)

on hose disconnect surfaces for operator manipulation thereof on knobs, dials and handles requiring operator manipulation on conveyor belt surfaces or assembly alignment systems where precision part placement is facilitated on the back side of a computer mouse pad (i.e., microreplicated surfaces on both sides of a mouse pad)

on opposed surfaces of belts and pulleys on railing or grip surfaces, such as for physical therapy, hand rails, pools, scaffold rails, safety rails, etc.

on footfall surfaces such as deck surfaces, industrial flooring, catwalks, etc.

on firefighting equipment (e.g., on stairs, treads, aprons, handles, grips, gloves, helmet straps, wearing apparel. etc.)

on food surface trays or other food surface surfaces (such as, for example, airline serving trays, carts, seat folddown trays, cup bottoms, etc.)

for maintaining articles of clothing in place by opposed or single patches of the inventive friction control article positioned in strategic locations thereon high shear friction fixture mounts for industrial applications for preventing slip control between relative boxes or containers when stacked for storage or transportation, (or between pallets and materials thereon). In this application, the entire container may be covered with the inventive friction control article or patches thereof selectively applied (e.g., on major faces or corners for use alone or in mated combination with opposed patches of the inventive friction control article on other container surfaces). The inventive friction control article can be formed on the container itself or applied by suitable means such as pressure sensitive adhesive or other fastening schemes. The inventive friction control article can also be used in this manner as a separate unadhered sheet placed between stacked containers, wherein the sheet has stems extending from one or both sides thereof.

- as pads or mats for display cases, such as jewelry display cases
- as storage or shipping surfaces for delicate components such as electronic parts or flammable materials, including for electronic parts an optional anti-static characteristic
- on handles for power tools, brushes, manual tools, wheelbarrels, valve handles, etc.
- as a non-skid podium cover or surface
- as a surface or patch on luggage, cases, purses, back straps (on the bottom, side or support strap surfaces thereof) for preventing skidding thereof during transportation or to enhance handling thereof by a user or handler
- on gloves for any industrial purpose where a specific frictional glove gripping surface is desired, used alone or in combination with a mated inventive friction control article on the equipment being manipulated by the glove's wearer In many of these industrial/commercial applications, a single friction control article may be sufficient to provide the desired frictional and/or gripping characteristics. In an application where a glove is worn by a user for engaging something else (such as a tool handle or valve handle), both the glove and handle can be provided with the inventive friction control article to provide high shear strength between the opposed mated friction control articles but allow quick peel (i.e., release) therebetween, and to improve the user's grip. In addition, the friction control article can be applied to such industrial/commercial items by either molding it in a particular shape, applying patches thereof using adhesive or other affixing means, or by wrapping the items (such as a tool handle) with a tape of the friction control article.

One common action in many of above-identified applications is the need to grip (for example, in sports, the need to grab, hold, squeeze, catch, swing, turn, etc.). The microreplicated gripping surface of the present invention helps satisfy this need by increasing gripping performance, and can promote gripping performance in both dry and wet conditions. The stems or "pins" that form the unique friction control article surface are flexible, and can fit into tiny various nooks and crannies of an opposed surface to provide a secure grip. In addition, the material works well in a wet environment. The inventive friction control article contributes to a significant performance improvement when it is mated to form a frictional interface with another component that has the same type of friction control article thereon. The stems interfere to provide high shear strength, but one can easily "peel" or lift away one layer of the friction control article from the other. In most applications, these types of gripping properties are important. Users of the inventive slip control article (in both single sheet and mated double sheet applications) detect a noticeable difference in gripping and frictional relation characteristics. A significant contributing factor in this regard, and in particular in creating a very soft feel to the inventive material, is the small stem diameters (when round) or small stem maximum cross-sectional dimension (when otherwise configured).

Elastomeric Materials

The elastomeric material can be any thermoplastic elastomer that can be heated to a state in which it can be flowed and molded, such as those described in G. Holden et al., *Thermoplastic Elastomers*, (2$^{nd}$ ed. 1996). It is also within the scope of this invention to use two or more different thermoplastic elastomeric materials in either layered or blended form to define that portion of the slip control article.

The term "elastomer" or "elastomeric" is used to refer to rubbers or polymers that have resiliency properties similar to those of rubber. In particular, the term elastomer reflects the property of the material that it can undergo a substantial elongation and then return to its original dimensions upon release of the stress elongating the elastomer. In all cases an elastomer must be able to undergo at least 10% elongation (at a thickness of 0.5 mm), and more preferably at least 30% elongation, and return to at least 50% recovery after being held at that elongation for 2 seconds and after being allowed 1 minute relaxation time. More typically, an elastomer can undergo 25% elongation without exceeding its elastic limit. In some cases elastomers can undergo elongation to as much as 300% or more of their original dimensions without tearing or exceeding the elastic limit of the composition. Elastomers are typically defined to reflect this elasticity as in ASTM Designation D883-96 as a macromolecular material that at room temperature returns rapidly to approximately its initial dimensions and shape after substantial deformation by a weak stress and release of the stress. ASTM Designation D412-98A can be an appropriate procedure for testing rubber properties in tension to evaluate elastomeric properties.

For some applications, thermoset elastomers may be used. Generally, such compositions include relatively high molecular weight compounds which, upon curing, form an integrated network or structure. The curing may be by a variety of methods, including chemical curing agents, catalysts, and/or irradiation.

The final physical properties of the material are a function of a variety of factors, most notably: number and weight average polymer molecular weights; the melting or softening point of the reinforcing domains (hard segment) of the elastomer (which, for example, can be determined according to ASTM Designation D1238-86); the percent by weight of the elastomer composition which comprises the hard segment domains; the structure of the toughening or soft segment (low Tg) portion of the elastomer composition; the cross-link density (average molecular weight between crosslinks); and the nature and levels of additives or adjuvants, etc.

Examples of classes of elastomers include anionic triblock copolymers, polyolefin-based thermoplastic elastomers, thermoplastic elastomers based on halogen-containing polyolefins, thermoplastic elastomers based on dynamically vulcanized elastomer-thermoplastic blends, thermoplastic polyether ester or polyester based elastomers, thermoplastic elastomers based on polyamides or polyimides, ionomeric thermoplastic elastomers, hydrogenated block copolymers in thermoplastic elastomer interpenetrating polymer networks, thermoplastic elastomers by carbocationic polymerization, polymer blends containing styrene/hydrogenated butadiene block copolymers, and polyacrylate-based thermoplastic elastomers. Some specific examples of elastomers are natural rubber, butyl rubber, EPDM rubber, silicone rubber such as polydimethyl siloxane, polyisoprene, polybutadiene, polyurethane, ethylene/propylene/diene terpolymer elastomers, chloroprene rubber, styrene-butadiene copolymers (random or block), styrene-isoprene copolymers (random or block), acrylonitrile-butadiene copolymers, mixtures thereof and copolymers thereof. The block copolymers may be linear, radial or star configurations and may be diblock (AB) or triblock (ABA) copolymers or mixtures thereof. Blends of these elastomers with each other or with modifying non-elastomers are also contemplated. Commercially available elastomers include block polymers (e.g., polystyrene materials with elastomeric segments), available from Shell Chemical Company of Houston, Tex., under the designation KRATON™.

Method of Manufacture

Figure 9:
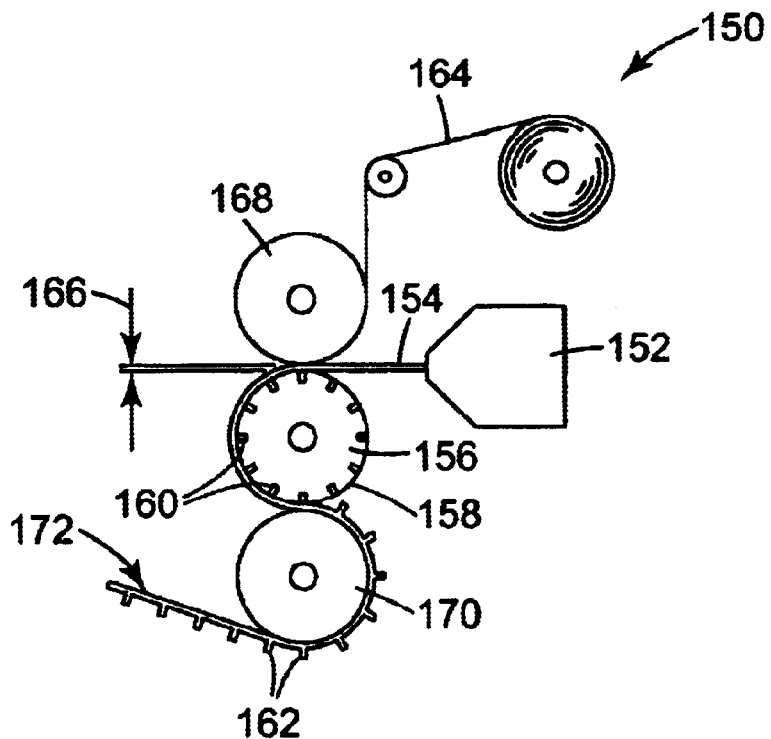
FIG. 9 is a schematic illustration of an exemplary method of manufacturing the slip control article in accordance with the present invention.

The process illustrated in FIG. 9 shows a three-roll vertical stack molding apparatus 150 which includes an extruder and extrusion die 152 adapted for extruding one or more layers of molten thermoplastic material 154 into a mold 156. In this case, the mold 156 is a roll 158, which has on its outer cylindrical surface a desired surface pattern for transference to the molten thermoplastic material 154 as it passes over the cylindrical surface of the roll 158. In the illustrated embodiment, the surface of the roll 158 has a plurality of arranged cavities 160 adapted to form a like plurality of upstanding stems 162. The cavities maybe arranged, sized and shaped as required to form a suitable surface stem structures from the thermoplastic material 154. In one embodiment, a sufficient additional quantity of molten thermoplastic material 154 is extruded into the mold 156 to form a portion of the backing layer (see FIGS. 1 and 3).

The roll 158 is rotatable and forms a nip 166, along with an opposed roll 168. The nip 166 between the roll 158 and opposed roll 168 assists in forcing the flow of molten thermoplastic material 154 into the cavities 160 and provides a uniform backing layer thereon. The spacing of the gap forming the nip 166 can be adjusted to assist the formation of a predetermined thickness of the backing layer of thermoplastic material 154. Optionally, backing layer 164 is simultaneously brought into the nip 166. Depending upon the composition of the elastomeric material and the geometry of the upstanding stems 162, the backing layer 164 may be useful in efficiently removing the slip control article 172 from the mold 156.

As illustrated in FIG. 9, the slip control article 172 may traverse a third roll 170 after exiting the roll 158. In this process, the temperatures of all three rolls 158, 168, 170 may be selectively controlled to achieve desired cooling of the thermoplastic material 154. The third roll 170 also serves to define the further path traversed by the slip control article 172.

The mold 158 may be of the type used for either continuous processing (such as a tape, a cylindrical drum or a belt), or batch processing (such as an injection mold or a compression mold). When making a mold 158 for forming the upstanding stems 162, the cavities 160 of the mold 158 may be formed in any suitable manner, such as by drilling, machining, laser drilling, water jet machining, casting, etching, die punching, diamond turning, engraving, knurling and the like. The placement of the cavities determines the spacing and orientation of the slip control article. The stems 162 typically have shapes corresponding to the shape of the cavities 160. The mold cavities can be open at the end of the cavity opposite the surface from which the molten thermoplastic material is applied to facilitate injection of the thermoplastic material into the cavity. If the cavity is closed, a vacuum can be applied to the cavity so that the molten thermoplastic material fills substantially the entire cavity. Alternatively, closed cavities can be longer than the lengths of the stem structures being formed so that the injected material can compress the air in the cavities. The mold cavities should be designed to facilitate release of the surface stem structures therefrom, and thus may include angled side walls, or a release coating (such as a Teflon material layer) on the cavity walls. The mold surface may also include a release coating thereon to facilitate release of the thermoplastic material backing layer from the mold. In some embodiments, the cavities can be angled relative to the surface of the roll.

The mold can be made from suitable materials that are rigid or flexible. The mold components can be made of metal, steel, ceramic, polymeric materials (including both thermosetting and thermoplastic polymers such as silicone rubber) or combinations thereof. The materials forming the mold must have sufficient integrity and durability to withstand the thermal energy associated with the particular flowable thermoplastic material used to form the backing layer and surface topographies. In addition, the material forming the mold preferably allows the cavities to be formed by various methods, is inexpensive, has a long service life, consistently produces material of acceptable quality, and allows for variations in processing parameters.

The molten thermoplastic material is flowed into the mold cavity, and over the surface of the mold to form the layer of cover material. To facilitate flow of the molten thermoplastic material, the thermoplastic material typically must be heated to an appropriate temperature, and then coated into the cavities. This coating technique can be any conventional technique, such as calendar coating, cast coating, curtain coating, die coating, extrusion, gravure coating, knife coating, spray coating or the like. In FIG. 9, a single extruder and extrusion die arrangement is shown. However, the use of two (or more) extruders and associated dies allows simultaneous extrusion into the nip 166 of a plurality of thermoplastic materials to achieve a multi-component (layered or blended) laminate cover material.

The flow of the molten thermoplastic material 154 into the mold 158 may also be facilitated by the application of pressure between opposing rolls 158 and 168. When the backing layer 164 includes a porous material, the three-roll vertical molding apparatus 150 controls the degree of penetration of the molten thermoplastic material 154. In this fashion, the quantity of molten thermoplastic material 154 can be controlled to barely penetrate the surface coating of the backing layer 164, or to penetrate the porous backing layer 164 on the opposite side of introduction of thermoplastic material 154 so as to almost encapsulate the backing layer 164. The penetration of the molten thermoplastic material 154 into the porous backing layer 164 may also be controlled by the temperature of the molten thermoplastic material 154, the quantity of thermoplastic material 154 in the nip 166, and/or by extruder flow rates in conjunction with the line speed of the mold cavities.

After the molten thermoplastic material 154 has been coated into the mold cavities 160 and over the mold surface 156, the thermoplastic material is cooled to solidify and form the desired exterior surface topography thereon (e.g., upstanding stems 162). The solidified thermoplastic material is then separated from the mold 158. The thermoplastic material 154 will often shrink when it is solidified, which facilitates release of the material (e.g., surface stem structures and backing layer) and integral film layer from the mold (see FIG. 1). Part or all of the mold may be cooled to aid in solidifying the surface stem structures and backing layer. Cooling can be effected by the use of water, forced air, heat transfer liquids or other cooling processes.

Some molding processes, such as injection molding, may utilize thermoset elastomeric polymers. When thermosetting resins are used as the molten material, the resin is applied to the mold as a liquid in an uncured or unpolymerized state. After the resin has been coated onto the mold, it is polymerized or cured until the resin is solid. Generally, the polymerization process involves either a setting time, or exposure to an energy source, or both, to facilitate the polymerization. The energy source, if provided, can be heat or radiation energy such as an electron beam, ultraviolet light or visible light. After the resin is solidified, it is removed from the mold. In some instances, it may be desired to further polymerize or cure the thermosetting resin after the surface stem structures are removed from the mold. Examples of suitable thermosetting resins include melamine, formaldehyde resins, acrylate resins, epoxy resins, urethane resins and the like. The formation of a backing layer having upstanding stem structures on at least one side thereof can be performed by injection molding or profile extrusion, such as is disclosed in U.S. Pat. No. 4,290,174 (Kalleberg); U.S. Pat. No. 5,077,870 (Melbye et al.); and U.S. Pat. No. 5,201,101 (Rouser et al.).

Test Procedure for Measuring Static and Dynamic Coefficients of Friction

The static and dynamic coefficient of friction for each film sample was measured on a Thwing-Albert Model 225-1 Friction/Peel Tester available from Thwing-Albert Instrument Company, Philadelphia, Pa. Equipment operation is specified in the Thwing-Albert Instruction Manual, Friction/Peel Tester, Model #225-1 revised 5/94, Software version 2.4. This analysis for the static coefficient of friction measured the horizontal force required to cause movement of a weighted 5.08 cm by 5.08 cm (2 inch by 2 inch) sample of the slip control article against a sample of artificial leather sold under the name Ultrasuede™ HP available from Toray Ultrasuede America located in Manhattan, N.Y.

The friction test specimen was prepared by anchoring a 5.08 cm by 5.08 cm (2 inch by 2 inch) sample of the slip control article to a 5.08 cm by 5.08 cm (2 inch by 2 inch) metal test sled. The test specimen was attached to the sled with a two sided pressure sensitive adhesive such as SCOTCH 9851, available from Minnesota Mining and Manufacturing Company, St. Paul, Minn. The metal test sled weighed 200 grams.

To prepare the artificial leather sample for the friction test a sample approximately 10.16 cm by 30.48 cm (4 inches by 12 inches) was anchored to a metal sheet with a two sided pressure sensitive adhesive tape, such as SCOTCH 9851 to prevent movement and wrinkling of the sample during the test.

The metal sheet with the sample adhered was clamped on to the metal platen testing surface with the provided spring clip. The metal test sled with film sample on bottom of the sled weighing 200 grams in total was placed on the fabric and pulled for 10 seconds at a speed of 5.1 cm (2 inches) per minute across the fabric per instructions specified in the instructions manual. The static coefficient of friction was then calculated by the machine wherein the measured horizontal force to cause slippage on the sample was divided by the 200 gram normal force of the sled. At least five measurements were recorded for each friction test sample and slip control article. Arithmetic averages were calculated by the friction/peel tester.

Test Method for Dynamic Shear Strength

The dynamic shear strength was measured on an I-mass peel tester. The tester was set up in the 180° Peel Mode. A sample about 3.8 cm×12.7 cm (1.5 inches×5 inches) of stem web was attached using a double sided tape, such as 3M 404, and centered lengthwise to an about 1.6 mm (1/16 inch) thick, 6.35 cm×22.9 cm (2.5 inches wide×9 inches long) aluminum test panel. Similarly, a sample about 2.54 cm×2.54 cm (1 inch×1 inch) of stem web was attached to the center of an about 1.6 mm (1/16 inch) thick, 6.35 cm×22.9 cm (2.5 inches wide×9 inches long) aluminum test panel. The panels were then placed together with the stems of each sample in contact with each other. The engaged thickness of the two samples without any pressure applied including the aluminum panels was measure using a digital caliper gauge. The weight of the upper panel was approximately 53 grams.

An aluminum panel with the larger sample of stem web was attached to the moving platform of the I-mass tester with the stem web side up. The aluminum panel with the sample about 2.54 cm×2.54 cm (1 inch×1 inch) of stem web was placed on top so that the stem webs were in an engaged position. The stem web was positioned so that it was at the end farthest away from the force gauge so that the sample on the upper panel would be pulled through the lower sample. A bar was placed over the engaged pair with a gap approximately 0.13 mm–0.254 mm (0.005–0.010 inches) greater than the engaged thickness. This bar is designed to prevent the samples from disengaging without exerting undue pressure to engage the two stem web samples. The end of the upper aluminum panel was attached to the force gauge in a position so that the gauge would measure a force directly parallel to the moving platform.

The I-mass tester was balanced, zeroed and adjusted to measure a 2 second averaging time. The position of the spacing bar was adjusted so that it would be directly above the stem web sample during the 2 second averaging time. The platform rate was set at 30.5 cm/minute (12 inches/minute). The peak, valley, and average forces were measure for each sample. Each sample was tested three times and the average values were calculated.

Materials Used in the Examples

A variety of elastomeric materials were used in the preparation of the samples of the examples. These materials are summarized in Table 1. Some properties of some of the samples are summarized in Table 2.

TABLE 1

| Material | Description |
| --- | --- |
| ESTANE ™ 58661 | available from B.F. Goodrich, Cleveland, OH |
| ESTANE ™ 58238 | available from B.F. Goodrich, Cleveland, OH |
| VECTOR ™ 4111 | available from Exxon Chemical Co., Houston, TX |
| ESTANE ™ 5740-820 | available from B.F. Goodrich, Cleveland, OH |
| KRATON ™ G1657 | available from Shell Oil Co., Houston, TX |

TABLE 2

| Material | Modulus @ 100%, MPa | Ultimate elongation | Tensile set 200% elongation | Friction Coef. | Tensile strength MPa | Hardness, Shore A |
|---|---|---|---|---|---|---|
| Polyurethane Estane ™ 58238 | 4.5 | 680% | 3% | 1.35 | 48.3 | 75 |
| Polyurethane Estane ™ 58661 | 5.86 | 640% | 3% | 1.4 | 52.4 | 80 |
| Polyurethane Estane ™ 5740x820 | 3.8 | 750% | 5.6% | 1.5 | 24.9 | 79 |
| Vector ™ 4111 | 1.9 | 1200% | 15% | 2.55 | 29 | 38 |
| Kraton ™ G1657 | 2.4 | 750% | 10% | 2.1 | 23.4 | 65 |
| MPR Alcryn ™ 2080-BK | 6.45 | 280% | 8% | .9–2.6 | 13 | 77 |

Rheology and Morphology of the Blends

Viscosities of both Estane™ 58661 and Vector™ 4111 were measured over several decades of shear rate using both a DSR and a capillary rheometer (CR) at 204° C. (400° F.), the temperature used in the stem web extrusion. It is apparent that at higher shear rates (>10 s−1), the viscosity and elasticity modulus of Vector™ 4111 are approximately twice that of Estane™ 58661.

Scanning electron microscopy (SEM) was used to investigate the morphology of blends of various compositions. The blends were mixed using a Brabender mixer and pressed into a silicone mold using a hot press method at about 216° C. (420° F.) at 6.9 MPa (1000 psi) for 60 seconds. The tool containing the material was cooled on dry ice. The sample was peeled from the mold. Only hot-pressed blends, described below, were studied. Micrographs were taken near the sample surface. A dispersed morphology was present in nearly every sample. Only in the 60/40 Estane™ 58661/ Vector™ 4111 sample were any co-continuous structures present.

EXAMPLES

Example 1

A 50:50 by weight of polyurethane resin Estane™ 58661 and a styrenic triblock copolymer Vector™ 4111 was dry blended as pellets. Polyurethane provided durability and resiliency of the structure while Vector improved frictional performance. The Estane™ 58661 was dried at about 82.3° C. (180° F.) for at least 4 hours. The mixture of pellets was mixed with about 2 wt % of carbon black/polyurethane blend. The content of carbon black in the final blend did not exceed 1 wt %.

The mixture was extruded as generally illustrated in FIG. 9, except that the tooling was configured as a belt rather than a roll. The extruder as a Davis Standard single screw extruder with about 6.35 cm (2.5 inches) screw diameter designed for polyolefin processing. At about 8 revolutions per minute (rpm), the melt was discharged through the die at melt pressure of about 13.8 MPa (2000 psi). The temperature in the last zone of the extruder was about 216° C. (420° F.). The temperature of the die was about 232° C. (450° F.). The opening of the die lip was about 0.51 millimeters (0.020 inches).

The melt was pressed into a silicone belt/tool with a metal roll at a nip pressure of about 345,705 Pa (50 psi). One of the rolls had a tooled surface that was heated to about 65.6° C. (150° F.). The surface contained an array of holes about 0.254 mm (0.010 inches) in diameter and about 0.46 cm (0.018 inches) apart. A backing layer of double coated tape available from Minnesota Mining and Manufacturing Company under product designation 404 was introduced into the nip and bonded to the side of the web opposite the upstanding stems. The web and double coated tape was removed from the tooled surface at a speed of about 1.5 meters/minute (5 feet per minute).

The resulting stem web had about 490 stems/centimeters$^2$ (3159 stems per square inch). The center-to-center spacing of the stems was about 0.439 mm (0.0173 inches) in the x-direction and about 0.465 mm (0.0183 inches) in the y-direction. Stem diameter was about 0.15 mm (0.0059 inches) and the stem height was about 0.625 mm (0.0246 inches). The gap between adjacent stems was about 0.127 mm (0.005 inches). Using the size of the tool diameter holes (0.010 inches) to define the largest possible individual stem cross-sectional area (0.00007854 inch$^2$), the area of each square inch of the stem web made up of stems (at about 3159 stems/inch$^2$) is thus no greater than about 24.85 of the total area.

Wetting capability of water was estimated by measuring a contact angle between a drop of water and flat substrate with the same composition as the stem web. The contact angle was measured to be about 65°, which was expected for a hydrophobic material (see generally FIG. 6). A large amount of water was then applied to the structured surface of the stem web and viewed in optical microscope. Water completely filled the space between the stems. The tips of the stems were exposed due to hydrophobic nature of the elastomer, as shown in FIG. 7. As a result of the exposed tips, frictional properties were improved when compared to flat sheet performance, when tested under the same conditions.

The gripping performance was evaluated using two approaches. The first set of experiments included direct measurements of the frictional properties of the stem web. The results were compared to the performance of the flat substrate made of the same polymer blend as the stem web. The second approach involved direct application of the stem web to an article. A 68.6 cm×2.54 cm (27 inches×1 inch) strip of the web was wrapped around a golf shaft and compared to the existing golf grips performance in both wet and dry conditions. A panel of evaluators took a series of swings with the golf club with the new grip. The performance of the invention was believed to be superior to the control sample in wet conditions. A similar test was conducted with a tennis racket.

Example 2

For more consistent removal of the stem web from the tooled surface and uniform application the articles, a two-layer construction was created using a co-extrusion process. The tooling and processing parameters were as described in Example 1 unless otherwise specified. Rather than the backing layer of the double coated tape in Example 1, a backing layer made of a 80:20 wt % blend of polyurethane Estane™ 58137 and Vector™ 4111 was co-extruded with the stem web. The polyurethane had hardness of 70 Durometer and the modulus of about 22 MPa (3200 psi). The stiffer backing layer was extruded using about 6.35 cm (2.5 inches) diameter screw at about 5 rpm. The top layer which formed the stemmed portion of the construction was extruded using about a 3.2 cm (1.25 inches) diameter screw extruder operating at about 15 rpm. The temperature profile was the same as described in Example 1. The polymer melt was discharged at a minimum pressure of about 6.9 MPa (1000 psi) and at the temperature in the front zone of about 216° C. (420° F.).

Both melts were combined in Cloeren feed block model no. 86-120-398 at about 232° C. (450° F.). A Cloeren extrusion die with a deckle system, model no. 89-12939, was used. The construction was removed from the tooled surface at about 1.5 meters/minute and about 3 meters/minute (5 fpm and 10 fpm). The resulting thickness of the each layer (not including the stems), at about 5 fpm take-up speed was about 0.254 mm (0.010 inches).

Example 3

A stem web was made generally according to Example 2 using a tool with different stem geometry and a pressure of about 68,941 Pa (10 psi), resulting in shorter stems. The stem web was a 80:20 by weight of polyurethane resin Estane™ 58661 and a styrenic triblock copolymer Vector™ 4111. The backing layer was made of a 80:20 wt % blend of polyurethane Estane™ 58137 and Vector™ 4111, co-extruded with the stem web as in Example 2.

The resulting stem web had about 235 stems/centimeters$^2$ (1516 stems per square inch). The center-to-center spacing of the stems was about 0.676 mm (0.0266 inches) in the x-direction and about 0.630 mm (0.0248 inches) in the y-direction. Stem diameter was about 0.198 mm (0.0078 inches) and the stem height was about 0.307 mm (0.0121 inches). The gap between adjacent stems was about 0.127 mm (0.005 inches). Using the size of the tool diameter holes (0.010 inches) to define the largest possible individual stem cross-sectional area (0.00007854 inch$^2$), the area of each square inch of the stem web made up of stems (at about 1516 stems/inch$^2$) is thus no greater than about 11.95 of the total area.

Example 4

A stem web with a single layer construction and a density of about 139 stems/cm$^2$ (900 stems/square inch) was created using a tool with different stem geometry and the same processing conditions and polymer blend formulation as in Example 1. The stems had about 50% larger diameter than the stems on the construction of Example 1, which lead to better durability of the construction. Stem height was about 0.56 mm to about 0.61 mm (0.022 inches to 0.024 inches). At a distance between the pins of about 0.84 mm (0.033 inches), individual pins could be felt. Thicker pins are also less flexible which also contributed to a more rough, or coarse feel of the surface. This surface is most suited for non-skin contact applications. Using the size of the tool diameter holes (0.010 inches) to define the largest possible individual stem cross-sectional area (0.00007854 inch$^2$, the area of each square inch of the stem web made up of stems (at about 900 stems/inch$^2$) is thus no greater than about 7.1% of the total area.

Example 5

A stem web was made using a tool with different stem geometry and substantially according to Example 1 with a 80:20 by weight of polyurethane resin Estane™ 58661 and a styrenic triblock copolymer Vector™ 4111. The resulting stem web had about 46 stems/centimeters$^2$ (299 stems per square inch). The center-to-center spacing of the stems was about 1.68 mm (0.066 inches) in the x-direction and about 1.29 mm (0.0507 inches) in the y-direction. Stem diameter was about 0.459 mm (0.0195 inches) and the stem height was about 0.617 mm (0.0243 inches). The gap between adjacent stems was about 0.254 mm (0.010 inches). The higher percentage of polyurethane increased durability of the resulting slip control article. Using the size of the tool diameter holes (0.020 inches) to define the largest possible individual stem cross-section area (0.00031416 inch$^2$), the area of each square inch of the stem web made up of stems (at about 299 stems/inch$^2$) is thus no greater than about 8.9% of the total area.

Example 6

Stem web sheets were made using silicone tooling similar to Example 1 and the hot press method discussed above. The formulations are set forth in Table 3, where the ratios refer to percentage of Estane™ 58661 to Vector™ 4111. The resulting stem web had about 490 stems/centimeters$^2$ (3159 stems per square inch). The center-to-center spacing of the stems was about 0.439 mm (0.0173 inches) in the x-direction and about 0.465 mm (0.0183 inches) in the y-direction. Stem diameter was about 0.15 mm (0.0059 inches) and the stem height was about 0.625 mm (0.0246 inches). The gap between adjacent stems was about 0.172 mm (0.005 inches).

In order to quantitatively compare the group properties of various blend compositions in both wet and dry conditions, a Thwing-Alber friction/peel tester was used to measure both static (SFC) and dynamic (DFC) friction. In addition, friction coefficients for flat sheets, i.e. the other side of the stem web, were also measured for a few of the blend compositions. The average SFC and DFC values for stem webs prepared in a batch process using a heated press of various formulations are given in Table 3.

TABLE 3

Frictional properties of blended stem webs in dry and wet conditions.

| Formulation | SFC Dry | DFC Dry | SFC Wet | DFC Wet |
|---|---|---|---|---|
| Estane 58661 | 1.3 | 1.25 | 1.2 | 1.1 |
| 80/20 | 1.5 | 1.5 | 1.4 | 1.4 |
| 60/40 | 1.8 | 1.75 | 1.7 | 1.6 |
| 50/50 | 1.85 | 1.75 | 1.7 | 1.6 |
| 40/60 | 2.1 | 2.0 | 2.0 | 1.9 |
| 20/80 | 2.3 | 2.11 | 2.1 | 1.8 |
| Vector 4111 | 2.5 | 2.3 | 2.3 | 2.1 |

Stem samples made from pure Vector™ 4111 have the highest DFC and SFC, and pure Estane™ 58661 stem samples have the lowest DFC and SFC. Mixtures are somewhere in between with a nearly linear relationship. In addition, SFC and DFC for each blend decreases with the addition of water between the stems and the Ultrasuede™ substrate. In fact, the addition of water causes an only about a 7% decrease in stem web friction for every blend composition. Small differences in friction performance are found for 50/50 and 60/40 blends. Based on frictional performance, the 60/40 formulations will lead to better wear properties since it possess a larger volume fraction of polyurethane.

Example 7

A stem web of 50:50 by weight of polyurethane resin Estane™ 58661 and a styrenic triblock copolymer Vector™ 4111 was made according to Example 1. The stem geometry is as set forth in Example 1. A flat sheet was also made using this formulation. The average SFC and DFC values for stem web and the flat sheet are given in Table 4.

TABLE 4

Stem web and flat film comparison.

| Sample ID | SFC Dry | DFC Dry | SFC Wet | DFC Wet |
|---|---|---|---|---|
| Flat Film | 2.12 | 2.08 | 1.3 | 1.3 |
| Stem web | 2.1 | 2.0 | 2.05 | 1.95 |

From Table 4 it is evident that both static and dynamic coefficients of friction are comparable for the stem web (60% Estane™ 58661 and 40% Vector™ 4111) and flat sheet when measured in dry conditions. However, when some water was added to the stem web, coefficient of friction of the flat sheet decreased by 30%, while stem web maintained its high friction, within the experimental error. This result is consistent with the mechanism of wetting described on FIGS. 6 and 7.

Example 8

Three samples of the stem webs of Examples 1, 3 and 5 were examined for dynamic shear strength using the test method described above. A summary of the results is found in Table 5.

TABLE 5

Dynamic Shear Strength - Dynes/cm$^2$ (ounces/inch$^2$)

| Example | Sample | Peak | Valley | Average |
|---|---|---|---|---|
| 1 | 1 | 168,481 (39.1 oz/sq. in.) | 140,904 (32.7 oz/sq. in.) | 157,709 (36.6 oz/sq. in.) |
| 1 | 2 | 144,351 (33.5 oz/sq. in.) | 140,904 (32.7 oz/sq. in.) | 143,489 (33.3 oz/sq. in.) |
| 1 | 3 | 202,523 (47.0 oz/sq. in.) | 81,009 (18.8 oz/sq. in.) | 136,595 (31.7 oz/sq. in.) |
| 1 | Average | 171,929 (39.9 oz/sq. in.) | 121,082 (28.1 oz/sq. in.) | 146,075 (33.9 oz/sq. in.) |
| 3 | 1 | 18,959 (4.4 oz/sq. in.) | 14,650 (3.4 oz/sq. in.) | 16,805 (3.9 oz/sq. in.) |
| 3 | 2 | 23,268 (5.4 oz/sq. in.) | 18,959 (4.4 oz/sq. in.) | 21,545 (5.0 oz/sq. in.) |
| 3 | 3 | 35,333 (8.2 oz/sq. in.) | 21,114 (4.9 oz/sq. in.) | 31,886 (7.4 oz/sq. in.) |
| 3 | Average | 25,854 (6.0 oz/sq. in.) | 18,097 (4.2 oz/sq. in.) | 23,268 (5.4 oz/sq. in.) |
| 5 | 1 | 168,051 (39.0 oz/sq. in.) | 107,725 (25.0 oz/sq. in.) | 133,148 (30.9 oz/sq. in.) |
| 5 | 2 | 152,969 (35.5 oz/sq. in.) | 80,578 (18.7 oz/sq. in.) | 135,733 (31.5 oz/sq. in.) |
| 5 | 3 | 152,538 (35.4 oz/sq. in.) | 81,009 (18.8 oz/sq. in.) | 112,034 (26.0 oz/sq. in.) |
| 5 | Average | 157,709 (36.6 oz/sq. in.) | 89,627 (20.8 oz/sq. in.) | 127,115 (29.5 oz/sq. in.) |

The stem webs made according to Examples 1 and 5 had the best dynamic shear strength. The samples from Examples 1 and 3 were more similar in stem density and stem diameter than those of Example 5. However, the stem height of the samples of Example 3 was approximately half the height of the stems of Examples 1 and 5. Even the relatively low density stem web of Example 5 outperformed the samples of Example 3. Therefore, stem height appears to be a significant factor in dynamic shear strength.

For the "Average" sample of Example 1, the average dynamic shear strength is about 85% of the peak dynamic shear strength (146,075÷171,929=0.8554). For the "Average" sample of Example 3, the average dynamic shear strength is about 90% of the peak dynamic shear strength (31,866÷35,333=0.9019). For the "Average" sample of Example 5, the average dynamic shear strength is about 80% of the peak dynamic shear strength (127,115÷157,700= 0.8060).

Example 9

A stem web was made using a tool with different stem geometry and substantially according to Example 1 with a 78:2:20 by weight blend of polyurethane Estane™ 28238, a black colorant (based on Estane™ 58238), and a styrene-isoprene-styrene triblock copolymer Vector™ 4111, respectively. The resulting stem web had about 3,100 stems/inch$^2$, with stem diameter of about 10 mil and stem heights of about 19 mil. The stems were arrayed in a square pattern, with equal spacing between adjacent stems in the x-direction and y-direction. The product specs for a friction control article of this example are a stem density of 2,500–3,500 stems/inch$^2$, a stem diameter of 9–11 mils. And a stem height of 14–24 mils. The friction control article of this example provides a stem web construction with high friction characteristics (the pseudo-coefficient of friction at 100 grams/inch$^2$ load was at least 6) and soft feel to the touch, suitable for such uses as bicycle handlebar grips and mating bicycle gloves. The stems are relatively flexible and bendable which creates the desired and predicted friction relationship between such a glove and grip. Using the size of the tool diameter holes (0.010 inches) to define the largest possible individual cross-sectional area (0.00007854 inch$^2$), the area of each square inch of the stem web made up of stems (at about 3100 stems/inch$^2$) is thus no greater than about 23.4% of the total area. Using the maximum stated stem diameter (11 mils) and the densest possible stem web in Example 9 (3500 stems/inch$^2$), the largest possible area of stem web is thus about 33.3% of the total area (3500 stems at 0.00009503 inch$^2$/stem=0.333 inch$^2$ per square inch).

Patents and patent applications disclosed herein are hereby incorporated by reference. Other embodiments of the invention are possible. It is to be understood that the above description is intended to be illustrative, and not restrictive. Other contemplated applications for the inventive article of the present invention include aesthetic and fashion patches for wearing apparel, as a material for use in making light body armor, as a squeegee or chamois material (wherein the material may be porous and water absorbent), as an electrostatically charged filter element or duct liner (optionally with anti-microbial characteristics), as a solar collector facing material, for vibration damping or cushioning applications, as a covering or the material for wrist restraining cuffs, and as the facing surface for an airbed (wherein the backing layer has apertures therethrough or apertures extending longitudinally through the stems for the introduction of pressurized air therethrough). In these application as well as those disclosed and suggested above, the inventive friction control article can include one or more of the features of the various embodiments disclosed herein, such as having micro-channels along one of the surfaces of the backing layer to aid in quickly dispersing liquids and thus enhancing the desired friction control characteristics of the article when wet. Many other embodiments will be apparent to those of skill in the art upon reviewing the above description. The scope of the invention should, therefore, be determined with reference to the appended claims, along with the full scope of equivalents to which such claims are entitled.

What is claimed is:

1. In a manual gripping activity where a user wears a slip control inhibiting glove to create a frictional interface between the user's glove and a surface of an article being gripped, the improvement which comprises:

disposing identical material surfaces on opposed contacting surfaces of the glove and article being gripped to define an effective frictional interface therebetween in both wet and dry conditions, each surface being a stem web defined by an array of 100 to 10,000 upstanding stems/inch$^2$ molded at least partially integrally with a backing layer, each upstanding stem being formed from an elastomeric material having a Shore hardness of less than about 90A, having a maximum cross sectional dimension of 0.003 to 0.030 inches, and having a height of less than 0.050 inches, so that each stem is highly flexible, each stem web having a static coefficient of friction when dry of at least 0.6, and each stem web individually having a soft and pleasant feel for skin contact, and when the opposed contacting surfaces of the glove and the article being gripped are engaged, each stem web having a dynamic shear strength of at least 16,805 dynes/centimeter$^2$, a peel strength of substantially zero and a tensile strength of substantially zero.

2. The improvement of claim 1 wherein the static coefficient of friction when dry is at least 1.3.

3. The improvement of claim 1 wherein the static coefficient of friction when dry is at least 2.0.

4. The improvement of claim 1 wherein each stem web has a static coefficient of friction when wet within 20% of its static coefficient of friction when dry.

5. The improvement of claim 1 wherein the backing layer comprises an elastomeric material integrally formed with the upstanding stems.

6. The improvement of claim 1 wherein the backing layer comprises additional layers of at least one of a reinforcing web, a foam layer, a substantially inelastic polymeric layer, or an adhesive layer.

7. The improvement of claim 1 wherein the backing layer comprises a blend polyurethane and a polystyrene material with elastomeric segments.

8. The improvement of claim 1 wherein the backing layer comprises a compound selected from the group consisting of elastomeric materials, polyvinyl, polyurethane, polyester, polyacrylic, polycarbonate, and polyolefin.

9. The improvement of claim 1 wherein the elastomeric material comprises a elastic block copolymer, styrene isoprene styrene, styrene butadiene styrene, styrene ethylene butadiene styrene, or a blend thereof.

10. The improvement of claim 1 wherein the backing layer has a plurality of holes therethrough.

11. The improvement of claim 1 wherein at least a portion of the upstanding stems comprise one of hydrophobic or hydrophilic properties.

12. The improvement of claim 1 wherein each upstanding stem has an aspect ratio of at least 1.25.

13. The improvement of claim 1 wherein the opposed contacting surface on the article being gripped is formed as a molded grip.

14. The improvement of claim 1 wherein the elastomeric material forming the backing layer and upstanding stems of the molded grip are formed from a material selected from the group consisting of hydrogenated block copolymers, polymer blends containing styrene/hydrogenated butadiene block copolymers, styrene-butadiene copolymers, styrene-isoprene copolymers, and polystyrene materials with elastomeric segments.

15. The improvement of claim 1, and further comprising: micro-channels on at least the first surface.

16. The improvement of claim 15, and further comprising: an absorbent material in fluid communication with the micro-channels.

17. The improvement of claim 1 wherein the total stem area of each stem web is less than about 45%.

18. The improvement of claim 17 wherein the total stem area of each stem web is less than about 40%.

19. The improvement of claim 18 wherein the total stem area of each stem web is less than about 35%.

20. The improvement of claim 19 wherein the total stem area of each stem web is about 30%.

21. A method of defining a frictional interface between opposed first and second surfaces, the method comprising:

aligning a first surface for contact with a second surface, wherein the first surface is formed as a stem web defined by at least 2000 upstanding stems per square inch molded at least partially integrally with a backing layer and occupying no grater than about 24.8% of the total area of the first surface, each stem being formed from an elastomeric material having a Shore hardness of less than about 90A, having a maximum cross sectional dimension of 0.030 inches, and having a height of less than 0.050 inches, wherein the elastomeric material and stem geometry provide an array of highly flexible stems which define a soft and pleasant feel for skin contact with the first surface, the stem web further having a static coefficient of friction when dry of at least 0.6 and wherein the stem web, when engaged with a stem web having the same defined characteristics, has a peel strength of substantially zero, a tensile strength of substantially zero and an average dynamic shear strength of about 80% of its peak dynamic shear strength;

applying a pressure force to urge the first and second surfaces together, causing the flexible stems of the stem web that are under pressure to bend thereby exposing additional stem surface area for frictional engagement relative to the second surface; and releasing the applied pressure force between the first and second surfaces whereby the bent flexible stems resume their original upstanding positions.

22. The method of claim 21 wherein the second surface is a stem web having the same defined characteristics as the stem web of the first surface, and further comprising:

as the stem webs of the first and second surfaces are urged together, interfitting their respective and opposed stems; and while the stem webs are urged together, applying a lateral displacement force of one surface relative to the other surface, with the interfitting opposed stems resisting relative motion of the two surfaces by mechanical interference with one another, by the force required to bend the stems, and by frictional engagement between the sides of opposed and bent stems.

23. The method of claim 21, and further comprising:
defining the second surface as a stem web having the same ranges of limitations as the stem web of the first surface but not necessarily identical in actual structure and composition.

24. The method of claim 21 wherein the first surface is at least a part of a user contacted surface such as a handle, grip, or operative surface on a sporting apparatus.

25. The method of claim 21 wherein the first surface exhibits a pseudo-coefficient of friction of at least 6, at 100 grams/inch$^2$ load.

26. The method of claim 21 wherein the backing layer of the stem web has a stem side surface and an opposite back side surface, and further comprising:
forming the backing layer so that at least a portion thereof is transparent; and
disposing images on the back side surface of the transparent portion of the backing layer so that the images are viewable through the transparent backing layer to an observer on the stem side surface thereof.

27. The method of claim 21, and further comprising:
forming the stems as generally cylindrical stems.

28. A method for joining two opposed surfaces in mated frictional engagement comprises:
defining a first article having a backing layer with a first surface and a second surface, wherein the backing layer of the first article has a first array of 900 or greater upstanding stems/inch$^2$ projecting from its first surface, wherein the stems of the first array are molded at least partly integrally with the backing layer of the first article out of an elastomeric material having a Shore hardness of less than about 90A and occupy no greater than 45% of the total area of the first surface of the first article, and wherein the elastomeric material and stem geometry provide an array of highly flexible upstanding stems which establish a soft tactile feel on the first surface of the first article;
defining a second article having a backing layer with a first surface and a second surface, wherein the backing layer of the second article has a second array of 900 or greater upstanding stems/inch$^2$ projecting from its first surface, wherein the stems of the second array are molded at least partly integrally with the backing layer of the second article out of an elastomeric material having a shore hardness of less than about 90A and occupy no greater than 45% of the total area of the first surface of the second article, and wherein the elastomeric material and stem geometry provide an array of highly flexible upstanding sterns which establish a soft tactile feel on the first surface of the second article; and
aligning the first and second arrays of stems in opposed, contacting and interfitting relation when a normal force is applied therebetween so that, upon application of a relative lateral displacement force, the stems of at least one of the stem arrays bend and relative lateral movement of the articles is resisted by the spatial interference of the opposed stems, the force required to bend those stems and the frictional interference between opposed contacting stems wherein at least one of the articles has stems having maximum cross sectional dimensions of 0.003 to 0.030 inches and heights of less than 0.050 inches, and wherein when aligned in opposed relation, at least one of the arrays of stems has an average dynamic shear strength of about 80% of its peak dynamic shear strength, a peel strength of substantially zero and a tensile strength of substantially zero.

29. The method of claim 28 wherein each of the arrays has greater than 2000 stems/inch$^2$.

30. The method of claim 28 wherein each stem array has 3100 or more stems/inch$^2$.

31. The method of claim 28 wherein the first article is a glove and the second article is a handle adapted to be gripped by a user.

32. The method of claim 28 wherein the backing layer of the stem web has a stem side surface and a back side surface, and further comprising:
forming the backing layer so that at least a portion thereof is transparent; and
disposing images on the back side surface of the backing layer so that the images are viewable through the transparent backing layer to an observer on the stem side surface thereof.

33. The method of claim 28 wherein the first article is formed as a molded grip.

34. The method of claim 33 wherein the molded grip is selected from the group consisting of golf club grips, baseball bat grips, racquet grips, bicycle handlebar grips, exercise equipment grips, and tool grips.

35. A method of defining a frictional interface between opposed first and second surfaces, the method comprising:
aligning a first surface for contact with a second surface, wherein the first surface is formed as a stem web defined by array of 900 or greater upstanding stems per square inch molded at least partially integrally with a backing layer and occupying no greater than about one third of the total area of the first surface, each stem being formed from an elastomeric material having a Shore hardness of less than about 90A, having a maximum cross sectional dimension of 0.003 to 0.030 inches, and having a height of less than 0.050 inches, so that each stem is highly flexible, wherein the array of such elastomeric stems defines a soft and pleasant feel for skin contact, the stem web further having a static coefficient of friction when dry of at least 0.6, and the stem web, when engaged with a stem web having the same defined characteristics, having a dynamic shear strength of at least 16,805 dynes per square centimeter, a peel strength of substantially zero, and a tensile strength of substantially zero;
applying a pressure force to urge the first and second surfaces together, causing the flexible stems of the stem web that are under pressure to bend thereby exposing additional stem surface area for frictional engagement relative to the second surface; and
releasing the applied pressure force between the first and second surfaces whereby the bent flexible stems resume their original upstanding positions.

36. The method of claim 35 wherein the second surface is a stem web having the same defined characteristics as the stem web of the first surface, and further comprising:
as the stem webs of the first and second surfaces are urged together, interfitting their respective and opposed stems; and
while the stem webs are urged together, applying a lateral displacement force of one surface relative to the other surface, with the interfitting opposed stems resisting relative motion of the two surfaces by mechanical interference with one another, by the force required to bend the stems, and by frictional engagement between the sides of opposed and bent stems.

37. The method of claim 35, and further comprising:
defining the second surface as a stem web having the same ranges of limitations as the stem web of the first surface but not necessarily identical in actual structure and composition.

38. The method of claim 35 wherein the first surface is at least a part of a user contacted surface such as a handle, grip, or operative surface on a sporting apparatus.

39. The method of claim 35 wherein the first surface exhibits a pseudo-coefficient of friction of at least 6, at 100 grams/inch$^2$ load.

40. A method for generating desired surface contact between two opposed contacting surfaces, the method comprising:

providing a first major surface having a stem web defined by an array of 900 or greater upstanding stems per square inch and occupying no greater than about one third of the total area of the first surface, wherein:

each stem has a side surface defining the upstanding perimeter of the stem and a top surface on a tip of the stem facing away from the first major surface;

each stem is formed from an elastomeric material having a Shore hardness of less than about 90A, has a maximum cross sectional dimension of 0.003 to 0.030 inches, and has a height of less than 0.050 inches, so that each stem is flexible;

the stem web has a static coefficient of friction when dry of at least 0.6, the stem web, when engaged with a stem web having the defined characteristics, has a dynamic shear strength of at least 16,805 dynes per square centimeter, has a peel strength of substantially zero, and has a tensile strength of substantially zero, and the stem web defines a soft and pleasant feel for skin contact;

allowing some of the stems of the stem web to bend upon application of a relative lateral displacement force through a contact between a second major surface and the first major surface, the bending of the stems facilitating direct local contact between the second major surface and at least a portion of the side surface of those stems, the direct local contact creating on each corresponding stein a frictional surface inclining by a measurable angle from a direction perpendicular to the first major surface; and allowing exertion of a reaction force on the second major surface at each local contact by the corresponding stem upon application of the relative lateral displacement force, such that relative lateral movement of the first and the second major surfaces is resisted, wherein the reaction force exerted on the second major surface is primarily contributed by a resistant force required to bend the stems and a frictional force along the frictional surface.

41. The method of claim 40, wherein the reaction force exerted on the second major surface is primarily contributed by the frictional force along the frictional surface.

42. The method of claim 40, and further comprising:

providing the second major surface with a stem web thereon, the stem web of the second major surface having the same ranges of limitations as the stem web of the first major surfaces, but not necessarily being identical in actual structure and composition to the stem web of the first major surface.

43. The method of claim 40 wherein the first major surface exhibits a pseudo-coefficient of friction of at least 6, at 100 grams/inch$^2$ load.

44. In a manual gripping activity where a user wears a slip control inhibiting glove to create a frictional interface between the user's glove and a surface of an article being gripped, the improvement which comprises:

disposing identical material surfaces on opposed contacting surfaces of the glove and article being gripped to define an effective frictional interface therebetween in both wet and dry conditions, each surface being a stem web defined by an array of about 3500 upstanding stems/inch$^2$ molded at least partially integrally with a backing layer with the stems occupying no greater than about one third of the total area of the first surface of the backing layer, each upstanding stem being formed from an elastomeric material having a Shore hardness of less than about 90A, having a maximum cross sectional dimension of 0.003 to 0.030 inches, and having a height of less than 0.050 inches, so that each stem is highly flexible, each stem web having a static coefficient of friction when dry of at least 0.6 and each stem web having a soft and pleasant feel for skin contact, and wherein when the opposed contacting surfaces of the glove and the article being gripped are engaged, the frictional interface therebetween has a peel strength of substantially zero, a tensile strength of substantially zero, and an average dynamic shear strength of about 80% of its peak dynamic shear strength.

45. The improvement of claim 44 wherein the opposed contacting surface on the article being gripped is formed as a molded grip.

46. The improvement of claim 44 wherein the backing layer of each stem web has a back surface opposite the stems thereon, and further comprising:

the backing layer of at least a portion of a first one of the stem webs being transparent; and images disposed on the back surface of the transparent backing layer so that the images are viewable through the transparent backing layer to an observer on the stem side thereof.

47. The improvement of claim 44 wherein each material surface exhibits a pseudo-coefficient of friction of at least 6, at 100 grams/inch$^2$ load.

* * * * *

UNITED STATES PATENT AND TRADEMARK OFFICE
CERTIFICATE OF CORRECTION

PATENT NO.       : 6,904,615 B2
APPLICATION NO.  : 10/436416
DATED            : June 14, 2005
INVENTOR(S)      : James J. Kobe It is certified that error appears in the above-identified patent and that said Letters Patent is hereby corrected as shown below:

Column 10
Line 64, delete "fictional" and insert -- frictional --, therefor.

Column 13
Line 59, after "( i.e." insert -- , --.

Column 14
Line 48, after "apparel" delete "." and insert -- , --, therefor.

Column 15
Line 30, delete "an" and insert -- any --, therefor.

Column 27
Line 51, Claim 7, after "blend" insert -- of --.
Line 58, Claim 9, delete "comprises" and insert -- comprise --, therefor.

Column 28
Line 31, Claim 21, delete "grater" and insert -- greater --, therefor.
Line 44, Claim 21, after "zero" insert -- , --.

Column 29
Line 45, Claim 28, delete "shore" and insert -- Shore --, therefor.
Line 49, Claim 28, delete "sterns" and insert -- stems --, therefor.
Line 58, Claim 28, delete "interference" and insert -- interface --, therefor.

Column 31
Line 23, Claim 40, after "stem is" insert -- highly --.
Line 27, Claim 40, after "having the" insert -- same --.
Line 41, Claim 40, delete "stein" and insert -- stem --, therefor.

Column 32
Line 5, Claim 42, delete "surfaces" and insert -- surface --, therefor.
Line 37, Claim 44, after "zero" delete ",".

UNITED STATES PATENT AND TRADEMARK OFFICE
CERTIFICATE OF CORRECTION

PATENT NO. : 6,904,615 B2  Page 2 of 2
APPLICATION NO. : 10/436416
DATED : June 14, 2005
INVENTOR(S) : James J. Kobe It is certified that error appears in the above-identified patent and that said Letters Patent is hereby corrected as shown below:

In the Drawings
Fig 10,

Delete " 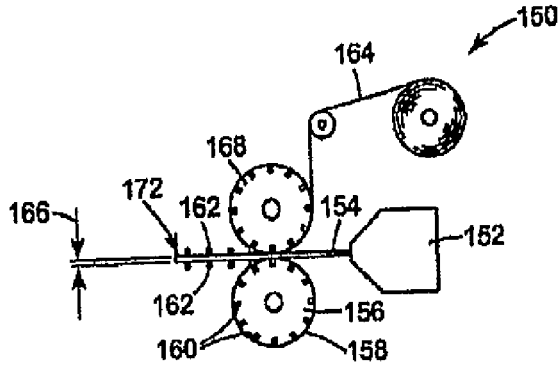 " and insert -- 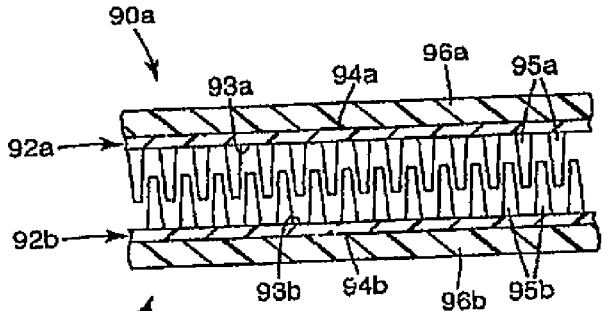 --, therefor.

Signed and Sealed this

Seventeenth Day of April, 2007

JON W. DUDAS
*Director of the United States Patent and Trademark Office*